(12) United States Patent
Wang et al.

(10) Patent No.: US 10,140,666 B1
(45) Date of Patent: Nov. 27, 2018

(54) SYSTEM AND METHOD FOR TARGETED DATA GATHERING FOR TAX PREPARATION

(71) Applicant: Intuit Inc., Mountain View, CA (US)

(72) Inventors: Gang Wang, San Diego, CA (US); Kevin M. McCluskey, Carlsbad, CA (US); Luis F. Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 438 days.

(21) Appl. No.: 14/673,646

(22) Filed: Mar. 30, 2015

(51) Int. Cl.
*G06Q 40/00* (2012.01)

(52) U.S. Cl.
CPC .................................. *G06Q 40/123* (2013.12)

(58) Field of Classification Search
CPC ..... G06F 17/22; G06F 17/243; G06Q 40/123; G06Q 40/02
See application file for complete search history.

(56) References Cited

U.S. PATENT DOCUMENTS

| | | | |
|---|---|---|---|
| 4,213,251 A | 7/1980 | Foundos | |
| 4,809,219 A | 2/1989 | Ashford et al. | |
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,742,836 A | 4/1998 | Turpin et al. | |
| 5,819,231 A | 10/1998 | Tremaine et al. | |
| 5,819,249 A | 10/1998 | Dohanich | |
| 6,078,898 A | 6/2000 | Davis | |
| 6,269,355 B1 | 7/2001 | Grimse et al. | |
| 6,334,110 B1 | 12/2001 | Walter et al. | |
| 6,535,883 B1 | 3/2003 | Lee et al. | |
| 6,601,055 B1 | 7/2003 | Roberts | |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Office Action dated Nov. 17, 2016 in U.S. Appl. No. 14/448,922, filed Jul. 31, 2014, inventor: Gang Wang.

(Continued)

*Primary Examiner* — Bruce I Ebersman
*Assistant Examiner* — Mark H Gaw
(74) *Attorney, Agent, or Firm* — DLA Piper LLP (US)

(57) ABSTRACT

A computer-implemented method for the targeted gathering of tax data for use with tax preparation software includes a computing device presenting to the user a plurality of interview questions or statements. The computing device creates a user profile based on the responses to the interview questions or statements. The computing device identifies highly relevant tax topics based on user profile and executes a user interface manager to automatically generate interview questions or statements on said highly relevant tax topics. The user then confirms whether other tax topics apply to the user. The computing device executes a tax calculation engine of the tax preparation software configured to compute a tax liability or refund amount.

23 Claims, 27 Drawing Sheets

(56) References Cited

U.S. PATENT DOCUMENTS

| | | |
|---|---|---|
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,850,924 B2 | 2/2005 | Grimse et al. |
| 6,898,573 B1 | 5/2005 | Piehl |
| 6,912,508 B1 | 6/2005 | McCalden |
| 6,925,441 B1 | 8/2005 | Jones et al. |
| 7,234,103 B1 | 6/2007 | Regan |
| 7,295,998 B2 | 11/2007 | Kulkarni |
| 7,331,045 B2 | 2/2008 | Martin et al. |
| 7,340,679 B2 | 3/2008 | Botscheck et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley et al. |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 * | 12/2010 | Quinn .................. G06F 17/243 705/30 |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,109,499 B2 | 2/2012 | Griese et al. |
| 8,126,820 B1 | 2/2012 | Talan |
| 8,190,499 B1 | 5/2012 | McVickar |
| 8,204,805 B2 | 6/2012 | Eftekhari et al. |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 * | 3/2013 | Eftekhari .............. G06Q 40/123 705/31 |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 * | 7/2013 | Tifford .................. G06Q 40/10 705/35 |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0023064 A1 | 2/2002 | Grimse et al. |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0192823 A1 | 9/2005 | Kuhn et al. |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0011036 A1 | 1/2007 | Lo |
| 2007/0033116 A1 | 2/2007 | Murray |
| 2007/0033117 A1 * | 2/2007 | Murray .................. G06F 17/243 705/31 |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0141247 A1 | 6/2008 | Saravanan |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0112807 A1 | 4/2009 | Bahn |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |

(56) References Cited

U.S. PATENT DOCUMENTS

| | | |
|---|---|---|
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0057659 A1 | 3/2010 | Phelon et al. |
| 2010/0063981 A1 | 3/2010 | Thomsen |
| 2010/0088124 A1 | 4/2010 | Diefendorf et al. |
| 2010/0131394 A1 | 5/2010 | Rutsch et al. |
| 2010/0153138 A1 | 6/2010 | Evans |
| 2010/0161379 A1 | 6/2010 | Bene et al. |
| 2010/0179916 A1 | 7/2010 | Johns et al. |
| 2011/0004537 A1 | 1/2011 | Allanson et al. |
| 2011/0078062 A1 | 3/2011 | Kleyman |
| 2011/0099063 A1 | 4/2011 | Clemmons |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0005209 A1 | 1/2012 | Rinearson et al. |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari et al. |
| 2012/0109793 A1 | 5/2012 | Abeles |
| 2012/0136764 A1 | 5/2012 | Miller |
| 2012/0173295 A1 | 7/2012 | Phelon et al. |
| 2012/0215669 A1 | 8/2012 | Lieberman et al. |
| 2012/0278365 A1 | 11/2012 | Labat et al. |
| 2012/0296768 A1 | 11/2012 | Fremont-Smith et al. |
| 2012/0323749 A1 | 12/2012 | Lapidus |
| 2013/0036347 A1 | 2/2013 | Eftekhari |
| 2013/0046603 A1 | 2/2013 | Grigg et al. |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Amendment dated Feb. 17, 2016 in U.S. Appl. No. 14/448,922, filed Jul. 31, 2014, inventor: Gang Wang.

Office Action dated Apr. 6, 2017 in U.S. Appl. No. 14/448,922, filed Jul. 31, 2014, inventor: Gang Wang.

Office Action dated Aug. 11, 2016 in U.S. Appl. No. 14/448,962, filed Jul. 31, 2014, inventor: Gang Wang.

Amendment dated Nov. 11, 2016 in U.S. Appl. No. 14/448,962, filed Jul. 31, 2014, inventor: Gang Wang.

Office Action dated Jan. 13, 2017 in U.S. Appl. No. 14/448,962, filed Jul. 31, 2014, inventor Gang Wang.

Office Action dated Aug. 23, 2016 in U.S. Appl. No. 14/448,986, filed Jul. 31, 2014, inventor: Gang Wang.

Response dated Jan. 23, 2017 in U.S. Appl. No. 14/448,986, filed Jul. 31, 2014, inventor: Gang Wang.

Office Action dated Feb. 17, 2017 in U.S. Appl. No. 14/448,986, filed Jul. 31, 2014, inventor: Gang Wang.

Office Action dated Jan. 12, 2017 in U.S. Appl. No. 14/462,411, filed Aug. 18, 2014, inventor: Gang Wang.

Office Action dated Feb. 7, 2017 in U.S. Appl. No. 14/555,543, filed Nov. 26, 2014, inventor: Gang Wang.

PCT International Search Report for PCT/US2016/039919, Applicant: Intuit Inc., Form PCT/ISA/210 and 220, dated Oct. 11, 2016.

PCT Written Opinion of the International Search Authority for PCT/US2016/039919, Applicant: Intuit Inc., Form PCT/ISA/237, dated Oct. 11, 2016.

PCT International Search Report for PCT/US2016/039917, Applicant: Intuit Inc., Form PCT/ISA/210 and 220, dated Oct. 11, 2016.

PCT Written Opinion of the International Search Authority for PCT/US2016/039917, Applicant: Intuit Inc., Form PCT/ISA/237, dated Oct. 11, 2016.

PCT International Search Report for PCT/US2016/039918, Applicant: Intuit Inc., Form PCT/ISA/210 and 220, dated Oct. 11, 2016.

PCT Written Opinion of the International Search Authority for PCT/US2016/039918, Applicant: Intuit Inc., Form PCT/ISA/237, dated Oct. 11, 2016.

PCT International Search Report for PCT/US2016/039913, Applicant: Intuit Inc., Form PCT/ISA/210 and 220, dated Oct. 21, 2016.

PCT Written Opinion of the International Search Authority for PCT/US2016/039913, Applicant: INTUIT INC., Form PCT/ISA/237, dated Oct. 21, 2016.

PCT International Search Report for PCT/US2016/039916, Applicant: Intuit Inc., Form PCT/ISA/210 and 220, dated Oct. 11, 2016.

PCT Written Opinion of the International Search Authority for PCT/US2016/039916, Applicant: Intuit Inc., Form PCT/ISA/237, dated Oct. 11, 2016.

http://quicken.intuit.com/support/help/tax-savings/simplify-tax-time/INF24047.html, updated Jul. 25, 2013, printed Jun. 24, 2014 (11 pages).

http://quicken.intuit.com/support/help/income-and-expenses/how-to-assign-tax-form-line-items-to-a-category/GEN82142.html, updated Aug. 11, 2011, printed Jun. 24, 2014 (2 pages).

http://quicken.intuit.com/support/help/reports--graphs-and-snapshots/track-the-earnings--taxes--deductions--or-deposits-from-paychecks/GEN82101.html, updated May 14, 2012, printed Jun. 24, 2014 (2 pages).

http://en.wikipedia.org/wiki/Dependency_grammar#Semantic_dependencies, printed Mar. 11, 2014 (15 pages).

(56) References Cited

OTHER PUBLICATIONS http://www.webopedia.com/TERM/L/loose_coupling.html, printed Mar. 11, 2014 (2 pages).
http://en.wikipedia.org/wiki/Loose_coupling, printed Mar. 11, 2014 (4 pages).
www.turbotax.com, printed Mar. 11, 2014 (7 pages).
https://turbotax.intuit.com/snaptax/mobile/, printed Mar. 11, 2014 (2 pages).
http://www.jboss.org/drools/drools-expert.html, printed Mar. 11, 2014 (5 pages).
http://en.wikipedia.org/wiki/Drools, printed Mar. 11, 2014 (4 pages).
http://en.wikipedia.org/wiki/Declarative_programming, printed Mar. 11, 2014 (4 pages).
http://www.wisegeek.com/what-is-declarative-programming.htm, printed Mar. 11, 2014 (2 pages).
http://docs.jboss.org/drools/release/5.3.0.Final/drools-expert-docs/html/ch01.html, printed Mar. 11, 2014 (10 pages).
https://developers.facebook.com/docs/marketing-apis, printed Feb. 6, 2015 (3 pages).
https://developers.facebook.com/docs/marketing-apis/using-the-api, printed Feb. 6, 2015 (2 pages).
https://developers.facebook.com/docs/marketing-api/overview, printed Feb. 6, 2015 (5 pages).
Office Action dated Sep. 9, 2015 in U.S. Appl. No. 13/923,266, filed Jun. 20, 2013, (31 pages).
Amendment filed Feb. 6, 2015 in U.S. Appl. No. 13/923,266, filed Jun. 20, 2013, (25 pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).

(56) References Cited

OTHER PUBLICATIONS

Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Vanderbilt University, "Free tax prep help available for Vanderbilt employees", Feb. 6, 2014, Vanderbilt University, p. 1-3 [NPL-1].
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).

(56) References Cited

OTHER PUBLICATIONS

Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Sep. 14, 2017 in U.S. Appl. No. 14/530,159, (41pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).

(56) References Cited

OTHER PUBLICATIONS

PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Response dated Dec. 28, 2017 in U.S. Appl. No. 14/701,149, filed Apr. 30, 2015, (46pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Communication pursuant to Rules 70(2) and 70a(2) EPC dated Apr. 25, 2018 in European Patent Application No. 16843282.1-1217, (1page).
Solomon L. Pollack; Analysis of the Decision Rules in Decision Tables, May 1963; The Rand Corooration; pp. iii, iv, 1, 20, & 24 (Year: 1963).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).

\* cited by examiner

| | Q_A | Q_B | Q_C | Q_D | Q_E | Q_F | Q_G | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 4

| Data Field | Source ID (124) | Confidence Level (126) | Confirmed by Taxpayer (128) | Range (130) |
|---|---|---|---|---|
| Name: John Smith | 01 | H | Y | N/A |
| # Dependents: 3 | 03 | M | N | 0 - 5 |
| Filing Status: Married, Joint | 03 | H | Y | N/A |
| SSN: XXX-XX-1234 | 03 | H | Y | N/A |
| ⋮ | | | | |
| W-2: ACME Corp. | 05 | M | N | N/A |
| W-2 Gross Wages: $52,000.00 | 05 | M | N | $10,000 - $75,000 |
| Student Loan Int: $1,800.00 | 06 | L | N | $0 - $12,000 |

SYSTEM AND METHOD FOR TARGETED DATA GATHERING FOR TAX PREPARATION

SUMMARY

In one embodiment, tax preparation software that runs on a computing device operates on a construct in which tax rules and the calculations based thereon are established in declarative data-structures, namely, completeness graph(s) and tax calculation graph(s). Use of these declarative data-structures permits the user interface to be loosely connected or even divorced from the tax calculation engine and the data used in the tax calculations. For example, the user interface can be designed to minimize the number interview questions that are asked to the user during the interview gathering process. The user interface can also be designed to be tailored to the particular taxpayer utilizing the tax preparation software. For example, past or prior year tax data may be used by the tax preparation software to selectively present certain tax topics that are relevant to the tax payer. In a related aspect, the tax preparation software may also make educated guesses or conjecture about relevant tax topics based on one or more characteristics that pertain to the taxpayer. These may include, by way of example, occupation, marital status, geographic location, filing status, and the like.

In one embodiment, at least some of the tax data pertaining to a user of the tax preparation software is automatically acquired by a data capture utility executed by the computing device. The data capture utility connects to one or more remotely located data sources and captures and transfers at least some tax data to a data store configured to store user-specific tax data. The data capture utility is able to automatically gather and collect tax related information that is needed by the tax preparation software to compute a tax liability or refund and ultimately complete a fileable tax return. The data capture utility thus significantly reduces the amount of manually entered tax data that is required to be input into the tax preparation software. The data capture utility speeds the process of preparing a tax return by automatically collecting and then storing in a data store or repository tax data that is used by the tax preparation software.

In one aspect of the invention, the data capture utility selectively targets a subset of the total universe of remotely located data sources. For example, the data capture utility may select the top several remotely located data sources that are statistically relevant to one or more characteristics of the taxpayer. For example, statistical data of other taxpayers sharing a common characteristic may indicate that certain remotely located data sources are likely to contain relevant information. For example, if a taxpayer lists his or her occupation as a truck driver, there is a statistically significant likelihood that the taxpayer may operate the truck as an owner operator. The tax preparation software is able to then automatically select, for example, Department of Motor Vehicle database records (or other equivalent agency) to obtain information on the make/model, and purchase date of the vehicle.

For tax data that is not automatically collected by the data capture utility, a user interface manager associated with the tax preparation software prompts the user for entry of additional tax data. The additional tax data may include any remaining tax data items that were not already stored in the data store by the data capture utility. The additional tax data may also be other tax data that is associated with or typically entered by other different taxpayers sharing one or more characteristics with the user of the tax preparation software program. In another aspect, tax data may be estimated by the use of an estimation module that is executed by the tax preparation software. Estimated values may be arrived at using as inputs data obtained by the data capture utility.

Tax calculations can be dynamically calculated based on tax-related data that is collected from the data capture utility, input from a user, or estimated by the tax preparation software. A smart tax logic agent running on a set of rules can review current run time data and evaluate missing tax data necessary to prepare and complete a tax return. The tax logic agent proposes suggested questions (or declarative statements) to be asked to a user to fill in missing blanks. This process can be continued until completeness of all tax topics has occurred. A completed tax return (e.g., a printed tax return or an electronic tax return) can then be prepared and filed with respect to the relevant taxing jurisdictions.

In another embodiment, a computer-implemented method for capturing tax-related data for use with tax preparation software is described. The method includes a computing device connecting to one or more remotely located data sources and executing a data capture utility, the data capture utility capturing and transferring at least some tax data pertaining to the user to a data store associated with the tax preparation software, the data store configured to store user-specific tax data therein. The computing device executes a user interface manager associated with the tax preparation software to prompt the user for entry of user-specific tax data not already stored in the data store by the data capture utility. The computing device executes a tax calculation engine of the tax preparation software configured to read the user-specific tax data obtained from the one or more remotely located data sources and the interface manager and compute an intermediate or final tax liability or refund amount.

In one embodiment, the one or more remotely located data sources may comprise a data source associated with a financial management program. Examples of financial management software includes, for example products or systems that are available from Intuit Inc. (e.g., MINT, QUICKEN, QUICKBOOKS and FINANCEWORKS). Financial management software allow consumers or business owners to combine, process, and categorize financial data and present numerical data in various forms or summaries such as balances or values, charts, graphs and reports. MINT, QUICKEN, QUICKBOOKS and FINANCEWORKS are registered trademarks of Intuit Inc., Mountain View, Calif.

In another embodiment, the one or more remotely located data sources may include user accounts for online financial service account(s) or online accessible social media accounts. The one or more remotely located data sources may also include employers, credit reporting bureaus, government agencies (e.g., court records, real property databases, motor vehicle databases, medical databases, or taxing authorities).

In one aspect, the data capture utility may include a screen scraping utility or a web crawler program. The data capture utility may ask the user for his or her credentials to a financial management software program that is, in turn, liked to various financial services accounts. The data capture utility may also ask the user for his or her credentials to financial management software accounts, online financial service accounts, online accessible social media accounts, credit bureaus, government agencies, or third party data provider (e.g., LEXIS/NEXIS). Alternatively or in addition to, the data capture utility may attempt to contact one or more remotely data sources without using any user provided credentials. For example, there may be some publicly available information in various online resources that may contain personal or tax data that can be captured and transferred by the data capture utility to the data store. The data capture utility may also connect to one or more locally located data sources. Such locally located data sources may include files or data associated with financial management software that is running locally on a computing device. Locally locate data sources may also include locally stored documents or even images. For example, PDF or image files of tax forms W-2s, 1099s, prior year tax returns, and the like may be interrogated by the data capture utility with relevant personal financial information extracted therefrom. The data capture utility may perform optical character recognition (OCR) on the data prior to transfer to the data store.

In one aspect of the invention, the computer-implemented method first utilizes tax preparation software to identify one or more tax topics that may be relevant to the taxpayer utilizing the tax preparation software. The tax topic may be identified based on prior tax return history (e.g., frequently used tax topics) that is particularized for the taxpayer. Alternatively, the one or more tax topics may be identified from other tax return data from different taxpayers. These topics may be extracted based on one or more shared characteristics (or combination of characteristics) between the taxpayer utilizing the tax preparation software and characteristics of taxpayers having stored tax return data. Tax topics may also be identified based on transactions that are entered in a financial management program (running either locally or remotely) or transactions contained in financial related online resources (e.g., bank or brokerage accounts).

Once the need information is contained within the data store, the computing device may execute a services engine that is configured to prepare a tax return for filing with relevant tax authorities. The tax return may be an electronic tax return or it may be a conventional paper tax return that is printed out by the user.

In another embodiment, a computer-implemented system for capturing user-related tax data for use with tax preparation software is described. The system includes a computing device operably coupled to a data store configured to store user-specific tax data therein. In one aspect, the tax preparation software may first look for any prior tax return data. This prior return data may be stored locally or remotely. By analyzing prior tax return data, common or recurring tax topics can be identified and flagged by the tax preparation software. For example, the software may flag that the taxpayer files Schedule D (capital gains and losses) every year. This means that the taxpayer will either be asked questions (or presented with a declarative statement) on this topic or, alternatively, one or more remote databases will automatically be searched to obtain information needed for Schedule D. The user interface manager is executed and may identify, for example, this flag and present to the user on or more questions regarding investments.

Alternatively, or in addition to, a data capture utility is executed by the computing device and configured to connect to one or more remotely located data sources, the data capture utility capturing and transferring at least some tax data pertaining to the user to the data store (e.g., in this case investment information regarding, for example, the sale of securities). The user interface manager is executed by a computing device that prompts the user for entry of user-specific tax data not already stored in the data store by the data capture utility or prompts the user to confirm certain data that was found automatically.

The system includes a tax calculation engine executed by the computing device and configured to read the user-specific tax data obtained from the one or more remotely located data sources and the interface manager and compute an intermediate or final tax liability or refund amount. The computing device may include a local device that has its own user interface or the computing device may be a separate, remotely located computing device. In the later example, the tax preparation software may be run, at least partially, in a cloud environment or software as service model where the user interface is local but the computational and data capture and gathering functionality is run on another computing device.

In another embodiment, a computer-implemented method for gathering user-related tax data for use with tax preparation software includes a computing device executing a data capture utility configured to connect to one or more remotely located data sources that relate to a particular topic that has been identified by the tax preparation software, wherein the data capture utility captures user-specific tax data from the one or more remotely located data sources and stores the captured data in a data store. The one or more remotely located data sources may optionally include a mix of paid and non-paid data sources. Alternatively, the one or more remotely located data sources may include non-paid data sources, e.g., financial and social media accounts liked to a specific user. A user interface manager may be executed by the tax preparation software that presents to the user a user interface to confirm data that has been obtained from the one or more remotely located data sources. Alternatively, the user interface manager may display one or more interview screens to the user to supplement or fill in the blanks that was not already obtained by the data capture utility.

The computing device executes a tax calculation engine of the tax preparation software configured to read the user-specific tax data obtained from the one or more remotely located data sources and the interface manager and compute an intermediate or final tax liability or refund amount.

In another embodiment, a computer-implemented method for gathering user-related tax data for use with tax preparation software includes a computing device executing a user interface manager that asks the user of the tax preparation software one or more preliminary questions that establish a tax characteristic profile. This tax characteristic profile of the user is then compared with a database containing tax characteristic profiles of other users. The tax characteristic profile correlates particular tax topics for a particular user. For example, tax characteristic profile "A" may indicate that the user typically is self-employed and files a Schedule C and deducts an automobile and a home office. Based on this profile, the user interface manager may select interview topics from these high probability topics. In this case, the user interface manager may ask the user whether he or she is self-employed and additional details regarding their business. Likewise the user interface manager may further ask about the possible home office deduction and automobile deduction.

In one aspect, the computer executes a data capture utility configured to connect to one or more remotely located data sources that relate to the particular topic that has been identified tax characteristic profile, wherein the data capture utility captures user-specific tax data from the one or more remotely located data sources and stores the captured data in a data store. This data may be obtained instead of manually entered data or this data may be obtained to confirm and/or verify data.

BRIEF DESCRIPTION OF THE DRAWINGS

FIG. 4 illustrates a decision table based on or derived from the completeness graph of FIG. 3.

FIG. 9 illustrates a table of estimated tax values and associate attributes according to one embodiment.

DETAILED DESCRIPTION OF ILLUSTRATED EMBODIMENTS

Figure 1:
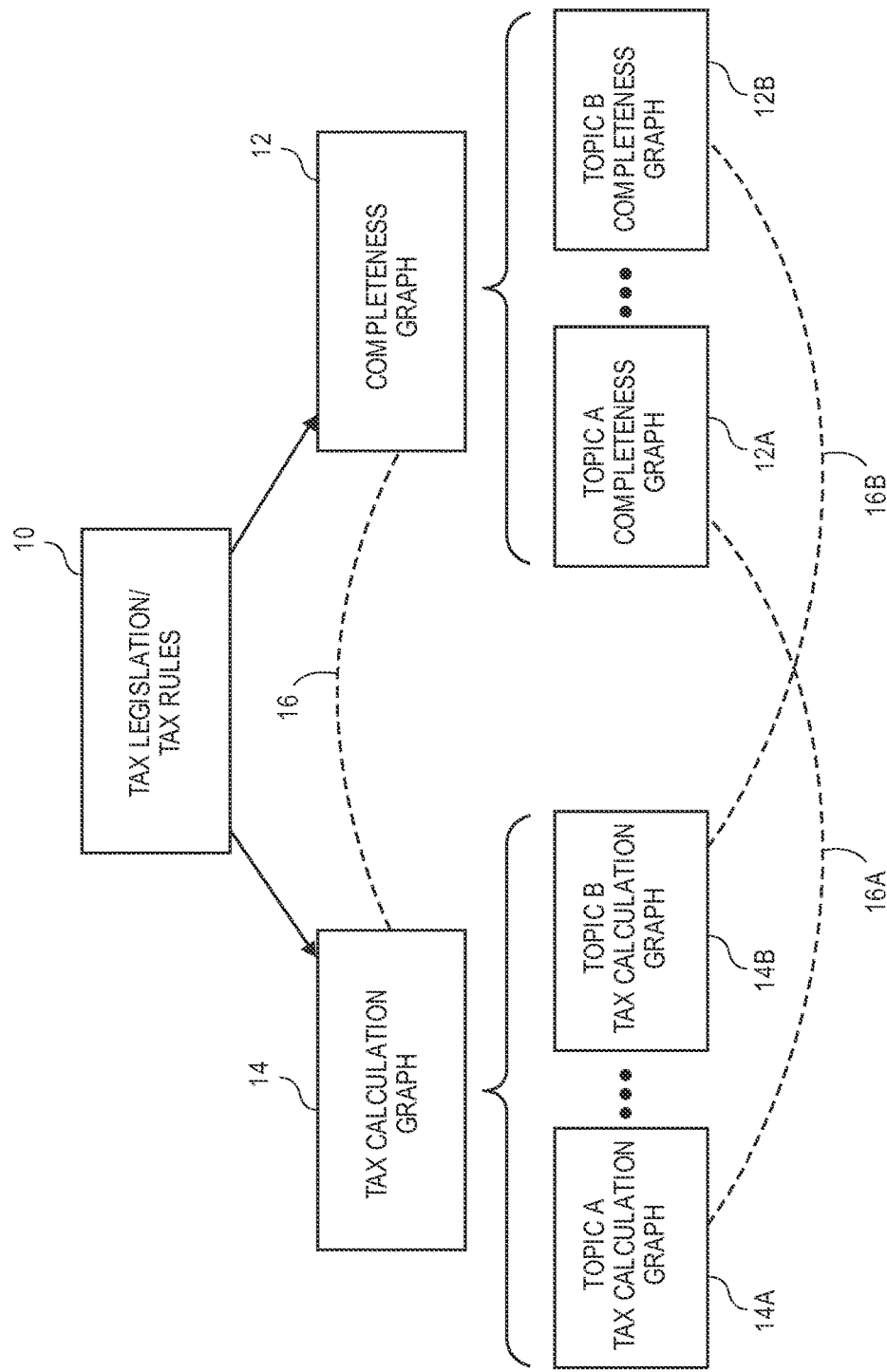
FIG. 1 schematically illustrates according to one embodiment how tax legislation/tax rules is parsed and represented by a completeness graph and a tax calculation graph.

Tax preparation is a time-consuming and laborious process. It is estimated that individuals and businesses spend around 7 billion hours per year complying with the filing requirements promulgated by the Internal Revenue Service in the United States. Tax preparation software has been commercially available to assist taxpayers in preparing their tax returns. Tax preparation software is typically run on a computing device such as a computer, laptop, tablet, mobile computing device such as a Smartphone, or remotely on another computer and accessed via a network. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the current methods and systems provide tax preparation software 100 that runs on computing devices 102 that operates on a construct or platform in which tax rules and the calculations based thereon are established in declarative data-structures, namely, one or more completeness graph(s) 12 and one or more tax calculation graph(s) 14.

Completeness graphs 12 and tax calculation graphs 14 are data structures in the form of graphs having nodes and interconnecting arcs in which arcs are directed from one node to another. Completion graphs 12 identify when all conditions have been satisfied to complete a particular tax topic or, collectively, produce a fileable tax return. The tax calculation graph 14 semantically describes data depending tax operations that perform a tax calculation or operation in accordance with tax code or tax rules. Examples of these data structures may be found in U.S. patent application Ser. Nos. 14/097,057 and 14/448,886, both of which are incorporated by reference as if set forth fully herein.

Use of these data-structures permits the user experience to be loosely connected or even divorced from the tax calculation engine and the data used in the tax calculations. Tax calculations are dynamically calculated based in tax data derived from sourced data that is obtained from a data capture utility as described herein, estimates, user input, or a combination of the above. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

According to one aspect of the invention, a computer-implemented for capturing user-related tax data for use with tax preparation software is provided. The computing device connects to one or more remotely located data sources and executes a data capture utility that captures and transfers at least some tax data to a data store configured to store user-specific tax data. The data capture utility is able to automatically gather and collect tax-related information that is needed by the tax preparation software to compute a tax liability or refund and ultimately complete a fileable tax return. The data capture utility thus significantly reduces the amount of manually entered tax data that is required to be input into the tax preparation software. The data capture utility speeds the process of preparing a tax return by automatically collecting and then storing in a data store or repository tax data that is used by the tax preparation software.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax return, for example, a sub-selection of topical completeness graphs 12A and tax calculation graphs 14A can be used for intermediate tax results such as Adjusted Gross Income (AGI) or Taxable Income (TI).

Figure 2:
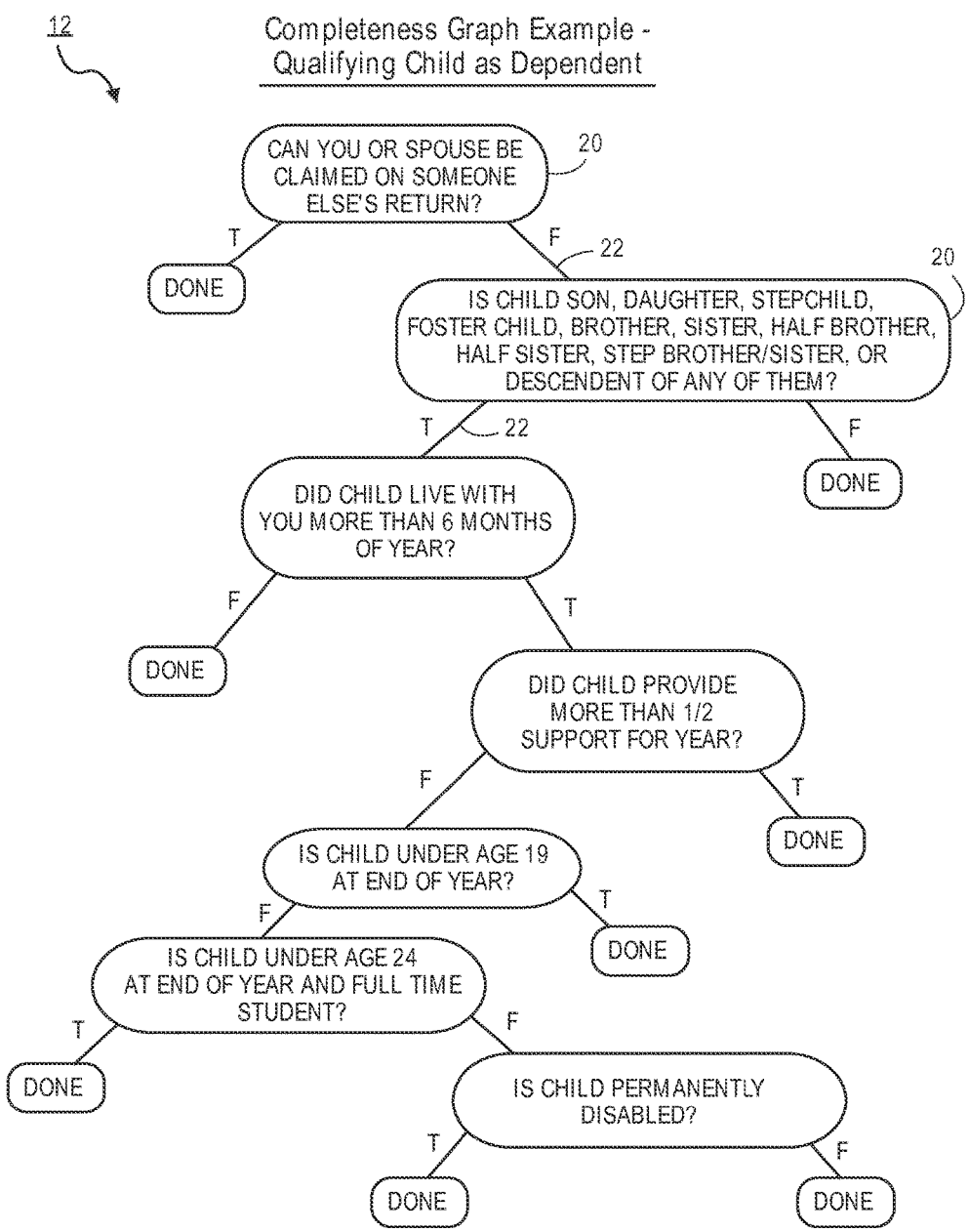
FIG. 2 illustrates an example of a simplified version of a completeness graph according to one embodiment related to a qualifying child for purposes of determining deductions for federal income tax purposes.

The completeness graph 12 and the tax calculation graph 14 represent data structures that can be constructed in the form of tree. FIG. 2 illustrates a completeness graph 12 in the form of a tree with nodes 20 and arcs 22 representing a basic or general version of a completeness graph 12 for the topic of determining, for example, whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than six months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, by many branches or lines within the completeness graph 12 can be ignored, for example, when certain questions internal to the completeness graph 12 are answered that logically eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
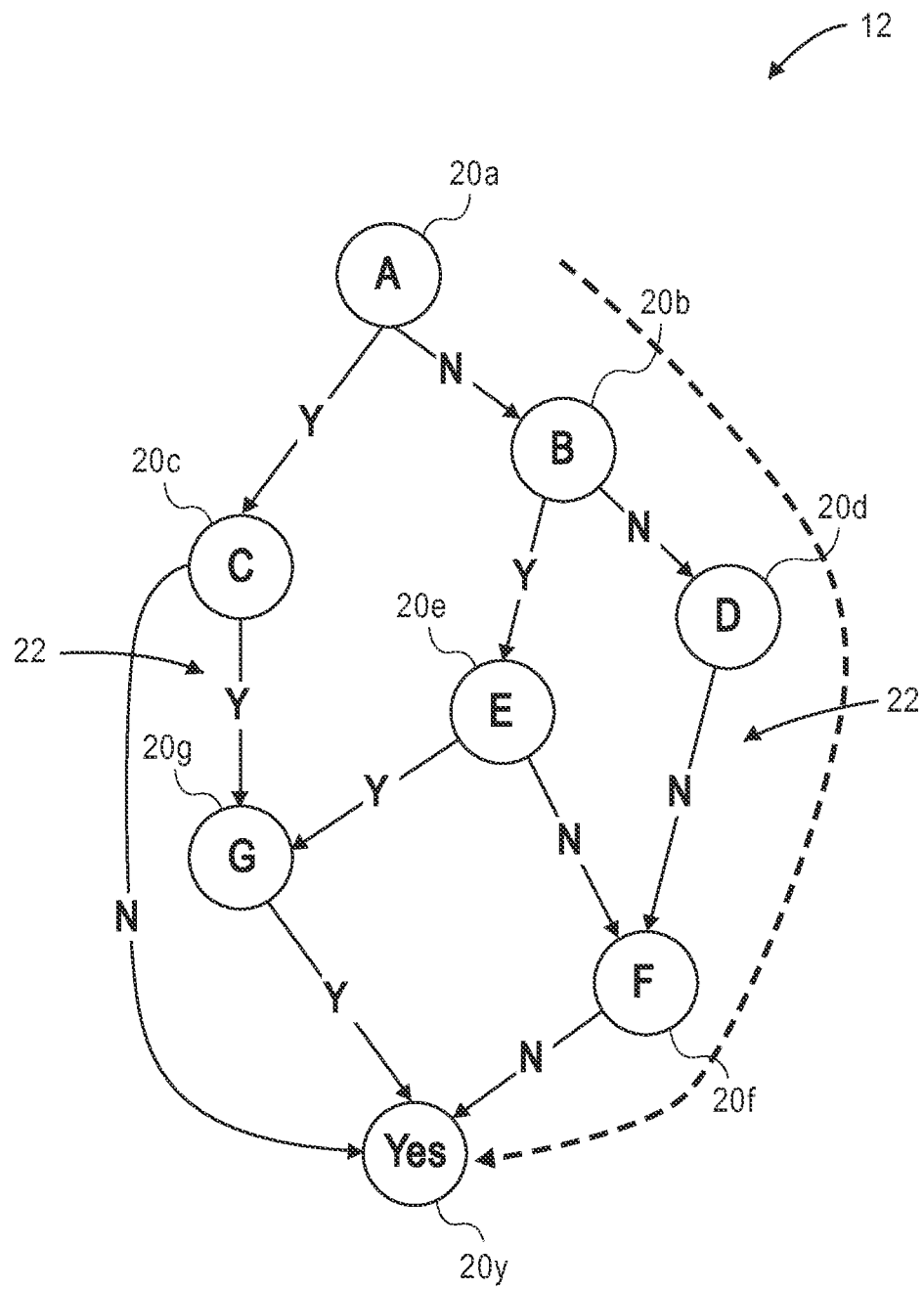
FIG. 3 illustrates another illustration of a completeness graph according to one embodiment.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule, state tax rule, or local tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After in initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

Figure 5:
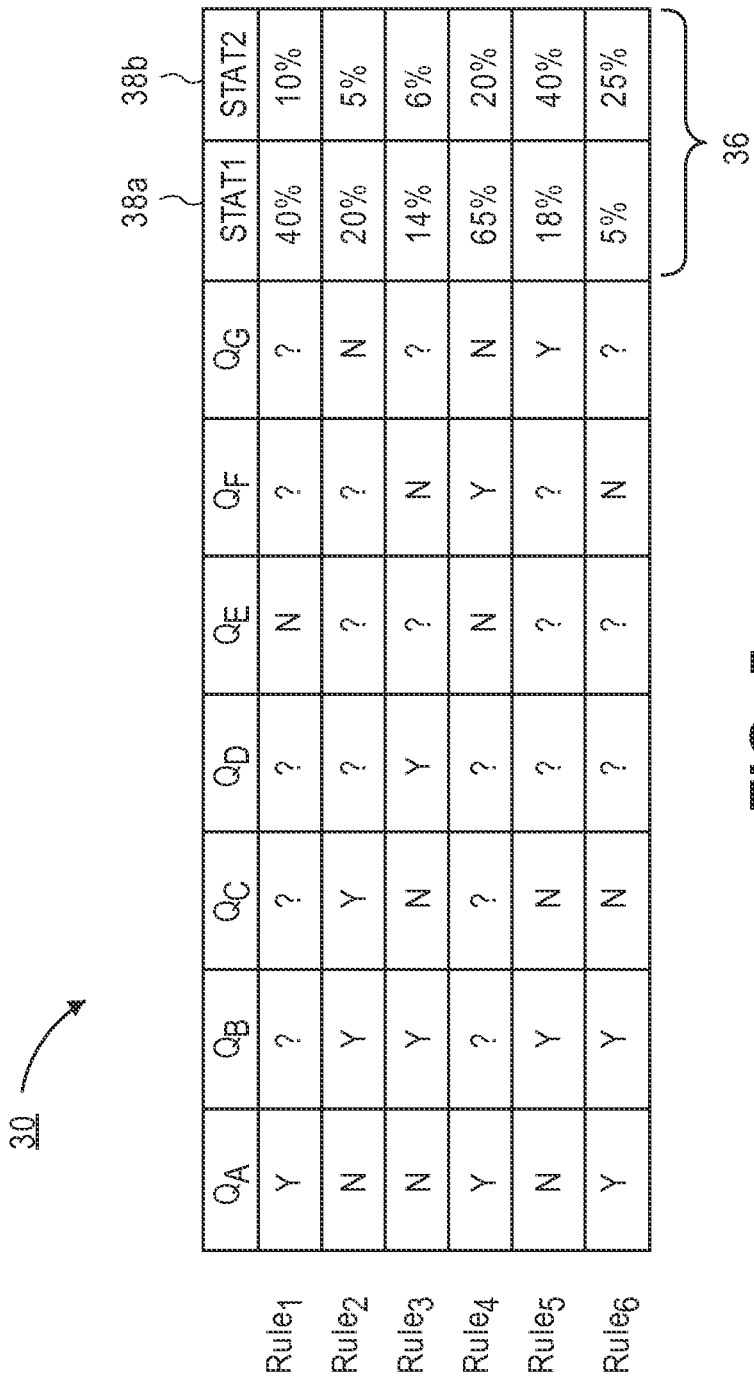
FIG. 5 illustrates another embodiment of a decision table that incorporates statistical data.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer. Predictive models based on the statistical data 36 may be used to determine candidate questions.

Figure 6:
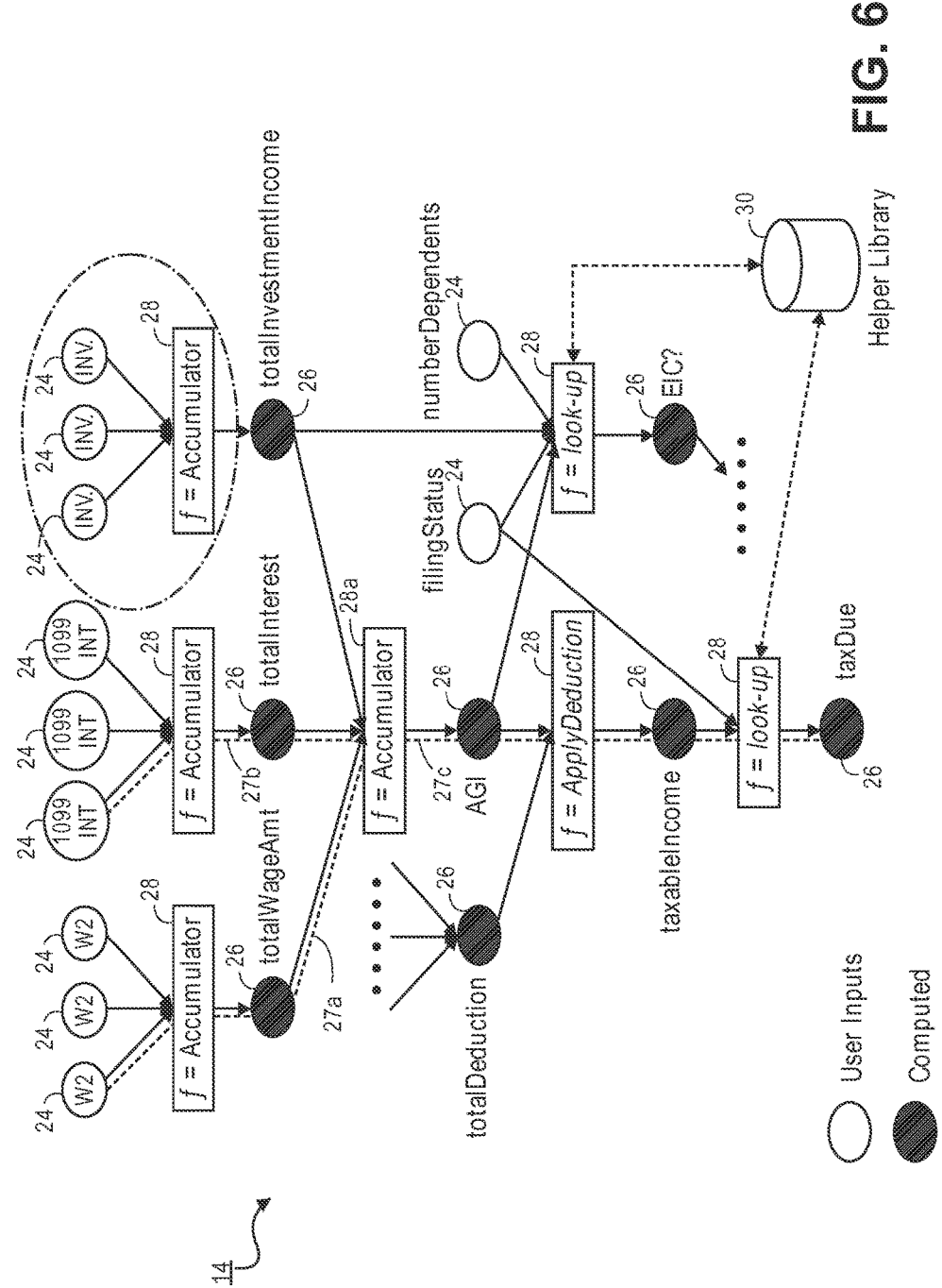
FIG. 6 illustrates an example of a calculation graph according to one embodiment.

FIG. 6 illustrates an example of a tax calculation graph 14. The tax calculation graph semantically describes the tax legislation/tax rules 10. In FIG. 6, various nodes 24 are leaf or input nodes. Examples of leaf nodes 24 in this particular example include data obtained from W-2 forms, data obtained from 1099-INT forms, data obtained from other investment income, filing status, and number of dependents. In other embodiments, however, the leaf nodes 24 may be populated with information that is automatically obtained by the tax preparation software 100. As described herein, for example, a data capture utility 43 may be executed by the tax preparation software 100 to capture and transfer tax data from one or more remotely located data sources to a data store that works in connection with the tax preparation software 100 to store user-specific tax data. In one embodiment of the invention, leaf nodes 24 may be automatically populated with data obtained from the data capture utility 43. For example, in some embodiments, the data capture utility 43 captures tax data from online resources such as financial services websites or other user-specific websites and transfers this data back to a data store. For instance, a user can provide his or her user credentials (e.g., user identification and password) for one or more online resources and the data capture utility 43 can then automatically capture information from these properties and transfer the same back to the data store for use by the tax preparation software 100. The online resources can be crawled and scanned to scrape or otherwise download tax related information that can be automatically populated into leaf nodes 24. Online social media and professional sites such as FACEBOOK, LINKED-IN and the like can also be accessed in a similar manner by the data capture utility 43 whereby personal or financial information may be captured and transferred to a data store that is used to populate the leaf nodes 24.

Additional third party information sources such as credit bureaus, government databases, and the like can also be used by the tax preparation software 100 to obtain information that can then be populated in to respective leaf nodes 24. In still other embodiments, values for leaf nodes 24 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software 100. In some instances, the data capture utility 43 uses object character recognition (OCR) techniques or the like to extract useful information from files or documents. For example, tax documents (e.g., W-2s or 1099s) may be imaged or scanned with relevant data being automatically extracted. In other embodiments, prior tax returns may be used by the tax preparation software 100 to extract information (e.g., name, potential dependents, address, and social security number) which can then be used to populate the leaf nodes 24. In still other embodiments, values for leaf nodes 24 may be estimated as described herein. Leaf nodes 24 may also be populated with user inputs. That is to say the user taxpayer will enter this information from a user interface (described in more detail below). Of course, a main goal of the invention described herein is to minimize the amount of manual entry required on behalf of a user. Instead, it is preferable to automatically capture this relevant information by using the data capture utility 43 and manual input of information Still other internal nodes 26 semantically represent a tax concept and may be calculated using a function 28. Some or all of these internal nodes 26 may be labelled as "tax concepts." Interconnected nodes 26 containing tax concepts may be connected via "gist" functions that can be tagged and later be used or called upon to explain to the user the reasoning behind why a particular result was calculated or determined by the tax preparation software 100 program as explained in more detail below. For example, the internal nodes 26 and associated functions 28 may be used to generate explanations to the user regarding the reasons behind certain tax calculations. U.S. patent application Ser. No. 14/530,159, which is incorporated by reference herein, explains how such explanations are automatically generated. Gists are well-defined functions to capture domain specific patterns and semantic abstractions used in tax calculations. Gists can be de-coupled from a specific narrow definition and instead be associated with one or more explanation. Examples of common "gists" found in tax legislation/rules include the concepts of "caps" or "exceptions" that are found in various portions of the tax code. The function 28 may include any number of mathematical or other operations. Examples of functions 28 include summation, subtraction, multiplication, division, and look-ups of tables or values from a database 30 or library as is illustrated in FIG. 6. It should be understood that nodes within completion graph 12 and the tax calculation graph 14 may be shared in some instances. For example, AGI is a reoccurring tax concept that occurs in many places in the tax code. AGI is used not only for the mathematical computation of taxes is also used, for example, to determine eligibility of certain tax deductions and credits. Thus, the AGI node is common to both the completion graph 12 and the tax calculation graph 14.

Figure 7:
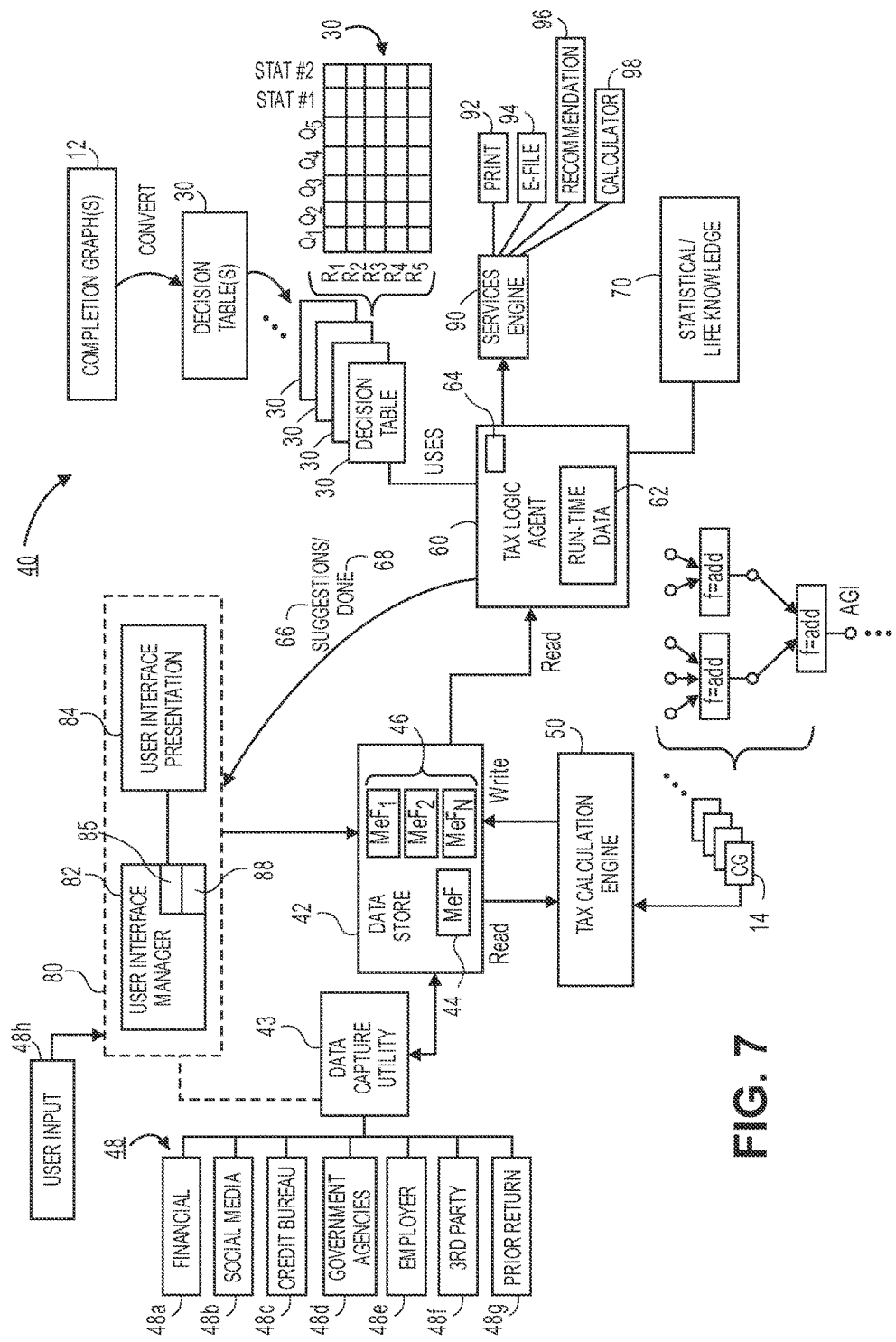
FIG. 7 schematically illustrates a system according to one embodiment for calculating taxes using rules and calculations based on a declarative data structures.

FIG. 7 schematically illustrates a system 40 for calculating taxes using rules and calculations based on a declarative data structures according to one embodiment. The system 40 include a data store 42 that contains therein a schema 44 or canonical model representative to the data fields utilized or otherwise required to complete a tax return. The data store 42 may be a repository, file, or database that is used to contain the tax-related data fields. The data store 42 is accessible by a computing device 102, 103 as described herein. The data store 42 may be located locally with the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version of the MeF model established by government authorities. The schema 44 may have extra fields available for flags (explained herein) that can be utilized to optimize suggested questions that can be presented to user as part of an interview process. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, a response to a Boolean expression (e.g., True/False or Yes/No), and flags. As explained in more detail, the data store 42 may, at any one time, have a particular instance 46 of the MeF schema 44 stored therein at any particular time. For example, FIG. 7 illustrates several instances 46 of the MeF schema 44 (labeled as $MeF_1$, $MeF_2$, $MeF_N$). These instances 46 may be updated as additional data is input or otherwise transferred into the data store 42.

As seen in FIG. 7, a data capture utility 43 is provided that is executed by or as part of the tax preparation software 100. The data capture utility 43 connects the computing device 102, 103 to one or more remotely located data sources 48a-48g. The data capture utility 43 captures tax data pertaining to the user and then transfers this information to the data store 42. Tax data includes any data that may be required or used by the MeF schema 44. Tax data does not necessarily have to include a monetary (e.g., income) component. For example, tax data could include data related to the number and identify of dependents within a household. It also includes other tax-related information such as income amounts and expenses related to tax deductions or credits. The data capture utility 43 may include a number of different forms. For example, the data capture utility 43 may include a screen scraping utility, web crawler, or program that is able to log into a website or other online interface (e.g., using an Application Program Interface or API) and copy all or selected portions of the data would normally appear on a display or screen to a user. The data capture utility 43 in the form of an API may allow for direct computer-to-computer transfer of data. The API may be provided, for example, by the host computer that is hosting the remote data source 48. This data can then be parsed, filtered, and organized such that relevant tax data is then transferred into the data store 42. The data capture utility 43 may also use a web crawler utility or program that is crawls over websites or other online content and copies all or selected portions of tax data and transfers the same to the data store 42.

The data capture utility 43 may be executed contemporaneously with the execution and use of the tax preparation software 100. Alternatively, the data capture utility 43 may be run prior to actual use of the tax preparation software 100 for tax return preparation. In the later approach, relevant data may be captured and stored in the data store 42 for later use. For example, a user may invoke or execute the data capture utility 43 on February 15$^{th}$ of a tax year and then later work on preparing his or her taxes closer to the deadline of April 15$^{th}$. The data capture utility 43 may be run again to capture any relevant data that was not already captured when run earlier (e.g., a tax form that was not available is now available for use).

Figure 15:
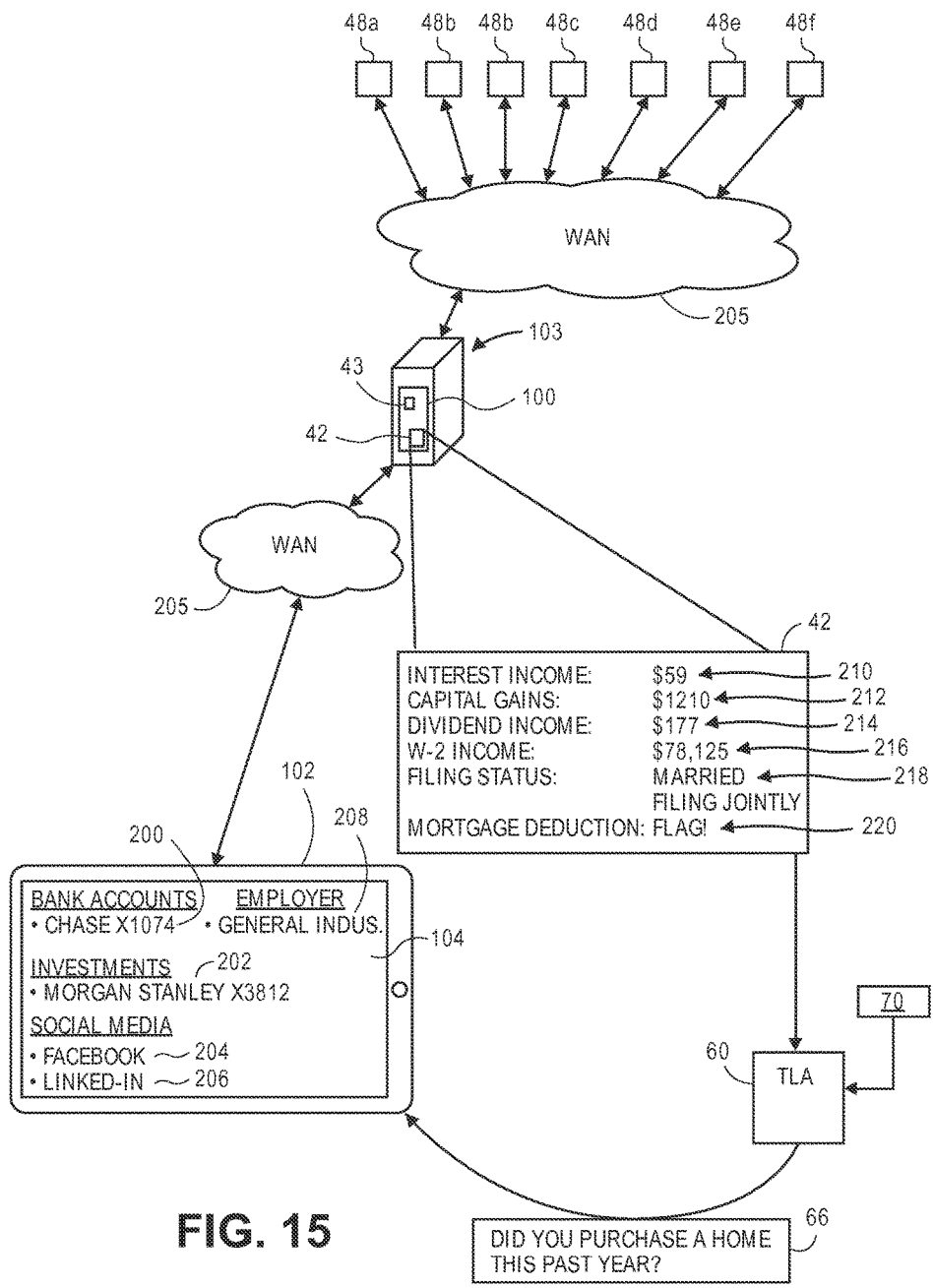
FIG. 15 schematically illustrates a system for capturing user-related tax data for use with tax preparation software according to one embodiment.
Figure 16:
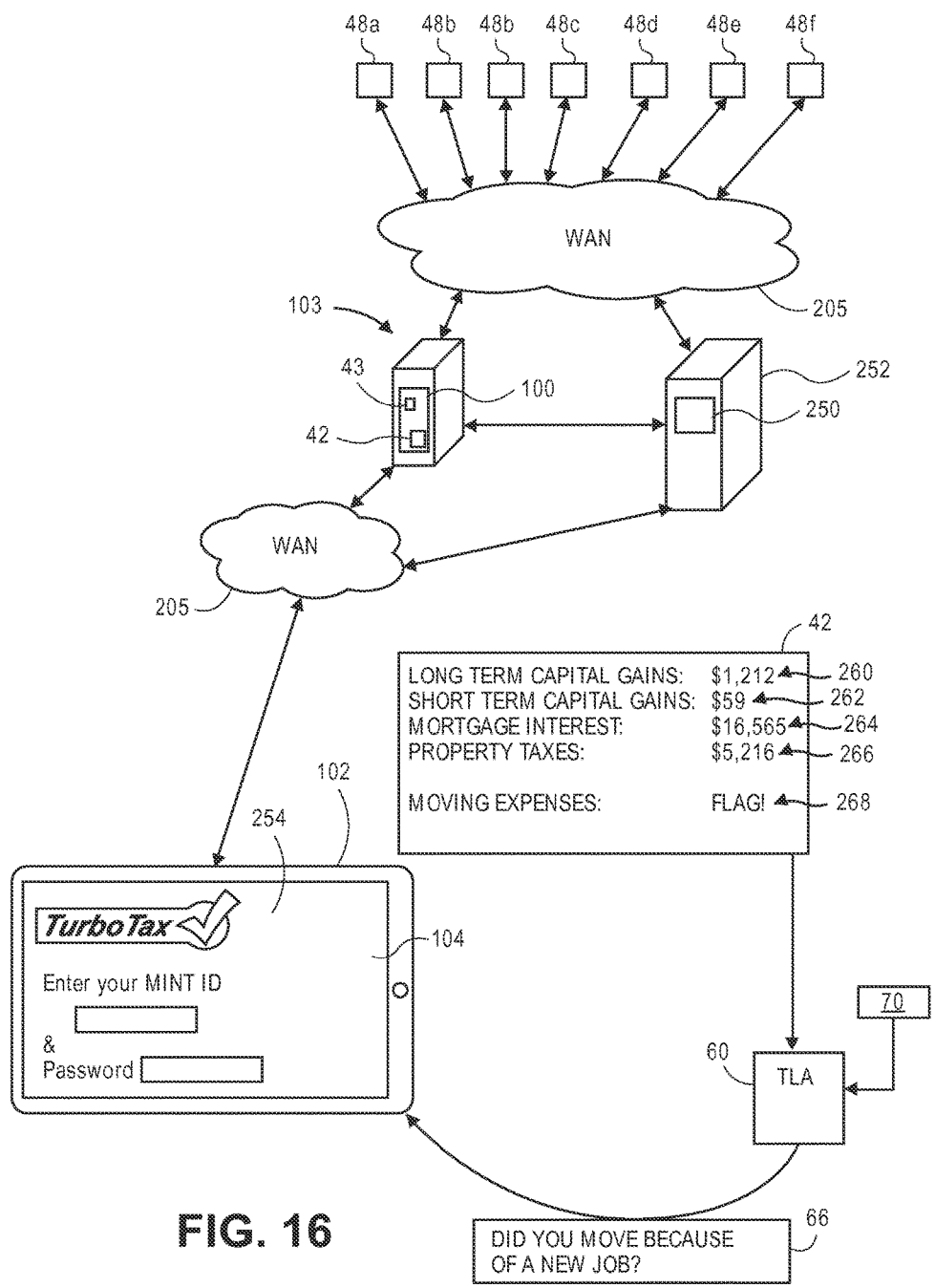
FIG. 16 schematically illustrates a system for capturing user-related tax data for use with tax preparation software according to another embodiment.

The data capture utility 43 may operate in a number of different modes to gain access to different user accounts. In one mode, a user will provide his or her authentication information (e.g., login ID and password) to the data capture utility 43 for each different online account as seen in FIG. 15. For example, a user may have one or more banking accounts, one or more investing accounts, an online account associated with a mortgage loan, and various social media accounts (e.g., FACEBOOK account, LINKED-IN account). In such instances, the user will identify each such account and provide the proper login credentials. The data capture utility 43 will then use this information to scrape or crawl each designated account and capture and transfer the tax data to the data store 42. In another mode, as illustrated in FIG. 16, the user does not have to provide his or her credentials for each account. Instead, the user may provide his or her credentials (e.g., password or user ID and password) to a financial management software program that itself is already linked to the various online financial services accounts. By gaining access to the financial management program this data capture utility 43 may be able to capture data from existing account histories already scrapped or crawled by the financial management program. The data capture utility 43 may also initiate the financial management program to synchronize or update all linked accounts so that the most recent information can be obtained. Of course, in this embodiment, the user may be requested to provide the authentication information for other accounts that are otherwise not linked or part of the financial management program. This would include, for example, social media accounts that are typically not contained in financial management programs. Thus, in some embodiments, a hybrid version incorporating aspects of the FIG. 15 and FIG. 16 may be used.

There are a number of different types of data sources 48*a*-48*g* that may be accessed by the data capture utility 43. For example, a financial data source 48*a* may include an account held with a financial service provider such as a bank, credit union, brokerage, investment advisor, or the like may be accessed by the data capture utility 43. A financial data source 48*a* may also include a financial management software program, application, or service such as MINT, QUICKEN, QUICKBOOKS, and the like. Such accounts typically provide online access to account information via a website though the invention is not limited to website access. The data capture utility 43 may access data via the website or through another Application Programming Interface (API). Most financial service providers such as banks, credit unions, brokerages, investment advisors typically provide online access for their customers to view holdings, balances, transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the data store 42 by the data capture utility.

Another example of an online resource that can be accessed by the data capture utility 43 includes social media data sources 48*b*. For example, many taxpayers may have social media or similar accounts. These include, by way of illustration and not limitation, FACEBOOK, LINKED-IN, TWITTER, and the like. User's may post or store personal information on these properties that may have tax implications. For example, a user's LINKED-IN account may indicate that he or she is married and has three children. The data capture utility 43 may capture this information and write to the data store 42 information regarding the family status of the particular user. For example, the data store 42 may be written with married, three dependents based on the information gathered by the data capture utility 43.

In still another example, a search of a user's social medial accounts may indicate that a person changed jobs during a tax year. Likewise, a posting on FACEBOOK about a new home may suggest that a person has purchased a home, moved to a new location, changed jobs; all of which may have possible tax ramifications. The identification of multiple jobs or residences during a tax year may be flagged by the data capture utility 43 or by the data store 42 after the information is transferred therein. This flagging may be used to drive or shape the interview process described herein. For instance, using the example above, a person may be asked a question whether or not she changed jobs during the year (e.g., "It looks like you changed jobs during the past year, is this correct?"). Additional follow-up questions can then be presented to the user such as asking for multiple W-2 forms for each job held during the year. Likewise, for the information that indicates that a person purchased a new home may prompt questions by the interface manager 82 that are directed to the user. For example, if the new residence was purchased, there may be tax deductible expenses such as loan origination points, moving expenses, and the like that may be deductible. By finding this personal financial information, the data capture utility 43 is able to more efficiently drive the remaining interview process to focus on relevant tax topics that are germane to events that occurred during the particular tax year of interest.

Still referring to FIG. 7, another data source includes credit data source 48*c* (e.g. a data source at a credit bureau) that may be accessed by the data capture utility 43. For example, credit data sources 48*c* contain a rich source of data that may implicate one or more tax items. For example, credit data sources 48c may show that a taxpayer has taken out a student loan or home mortgage loan that may be the source of possible tax deductions for the taxpayer. A credit data source 48c may indicate unpaid medical bills which may indicate the presence of large medical bills that could potentially be a deductible expense. Another example of a data source includes records from a database or other repository of a government agency data source 48d. For example, the state department of motor vehicles may contain information relevant to tax portion of vehicle registration fees which can be deductible in some instances. Other government agency data sources 48d that may be accessed include the IRS (e.g., IRS tax return transcripts), and state taxing authorities.

Another example of a data source 48 includes may include an employer data source 48e as illustrated in FIG. 7. For example, an employer may provide electronic or online access to payroll and/or tax reporting systems such that employees can access information such as tax reporting forms (e.g., W-2 forms). An employer data source 48e may also include a payroll processing company that provides payroll services for that particular employer (e.g., INTUIT Payroll, ADP, Paychex, and the like).

Another example of a data source 48 may include third party data sources 48f that collect, aggregate or store data that pertain to a user (e.g., LEXIS/NEXIS). For example, people searching services are currently available to find the location or residence address of persons. Likewise, commercial databases are available for asset searches for particular individuals. These third party data sources 48f typically require payment and may not need permission from the user as the information is obtained from various publicly available sources. In one aspect of the invention, the data capture utility 43 may submit a payment in order to access and collect this information. Payment may be made by the user of the tax preparation software 100. Alternatively, payment may be made by another party such as the provider or seller of the tax preparation software 100. For example, some users may be particularly valued users of the products and services of the provider of the tax preparation software 100 (e.g., these users utilize a variety of products and services or may be likely to do so in the future). For such users, payment may be made to the providers of the third party data sources 48f on behalf of the user so that the user may not incur these expenses directly. Of course, this is just one example and various payment arrangements could be made to facilitate the capture and transfer of relevant data to the data store 42 so that manual entry of data is minimized and/or avoided entirely.

In another aspect of the invention, the third party data source 48f may include a free source of information. For example, many webpages or other Internet accessible content is indexed by various search engines such as GOOGLE, YAHOO, and BING. User-related tax data may be obtained from the data capture utility 43 searching one or more of these third party data sources 48f.

Another example of a data source 48 is a prior year tax return 48g. A prior year tax return that is stored electronically as prior year tax return data 48g can be searched and data is copied and transferred to the data store 42. The prior year tax return may be in a proprietary format (e.g., .txf, .pdf) or an open source format. The prior year tax return may also be in a paper or hardcopy format that can be scanned or imaged whereby data is extracted using, for example, OCR and transferred to the data store 42. In this sense the tax return may be considered user input 48h as described below.

In another embodiment, prior year tax return data 48g may be obtained by accessing a government database (e.g., IRS records). For example, the IRS allows one to obtain transcripts of past tax returns in either an online or paper format. The data capture utility 43 can, for example, be provided with the user ID whereby this information is captured automatically. Alternatively, a paper copy may be sent to the taxpayer and an image is taken of the same, subject to OCR, with the relevant data fields captured and transferred to the data store 42.

While a main priority or goal of the invention is to avoid manual entry of tax related data into the tax preparation software 100, there will likely be some gapes or holes that will need to be filled by the manual entry of data. As seen in FIG. 7, user input 48h is one type of data source 48. User input 48h may take a number of different forms. For example, user input 48h may be generated by a user using, for example, a input device such as keyboard, mouse, touchscreen display, voice input (e.g., voice to text feature) or the like to enter information manually into the tax preparation software 100.

User input 48h may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the data store 42.

Still referring to FIG. 7, the tax preparation software 100 executed by the computing device 102, 103 includes a tax calculation engine 50 that computes one or more tax calculations based on the available data at any given instance within the schema 44 in the data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1 and 6. In one embodiment, a series of different calculation graphs 14 are used for respective tax topics. These different calculation graphs 14 may be glued together or otherwise compiled as a composite calculation graph 14 to obtain an amount of taxes due or a refund amount based on the information contained in the data store 42. The tax calculation engine 50 reads the most current or up to date information contained within the data store 42 and then performs tax calculations. Updated tax calculation values are then written back to the data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). The tax calculation engine 50 may be embodied as a programmed subroutine as part of the tax preparation software 100 that is executed by a processor or controller as described herein.

Still referring to FIG. 7, the system 40 includes a tax logic agent (TLA) 60. The TLA 60 operates in conjunction with the data store 42 whereby updated tax data represented by instances 46 are read to the TLA 60. The TLA 60 contains run time data 62 that is read from the data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented. The TLA 60 may be implemented as a dedicated module or engine that is executed by or as part of the tax preparation software 100 and may be embodied as a programmed subroutine that is executed by a processor or controller as described herein.

As seen in FIG. 7, The TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, which, as explained in more detail below presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing of compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher. Predictive modeling based on statistical data 36 using any suitable data such as previously filed tax returns, demographic information, financial information and the like may be used as part of this ranking process.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

Rule engine (64)/Tax Logic Agent (TLA) (60)
    // initialization process
    Load_Tax_Knowledge_Base;
    Create_Fact_Cache; While (new_data_from_application)
    Insert_data_into_fact_cache;
    collection=Execute_Tax_Rules; // collection is all the fired rules and corresponding conditions
    suggestions=Generate_suggestions (collection);
    send_to_application (suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(*b*) retirement accounts. This information may then be used by the TLA 60 when generating its suggestions 66. For example, rather than asking generically about retirement accounts, the suggestion 66 can be tailored directly to a question about 403(*b*) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Figure 13:
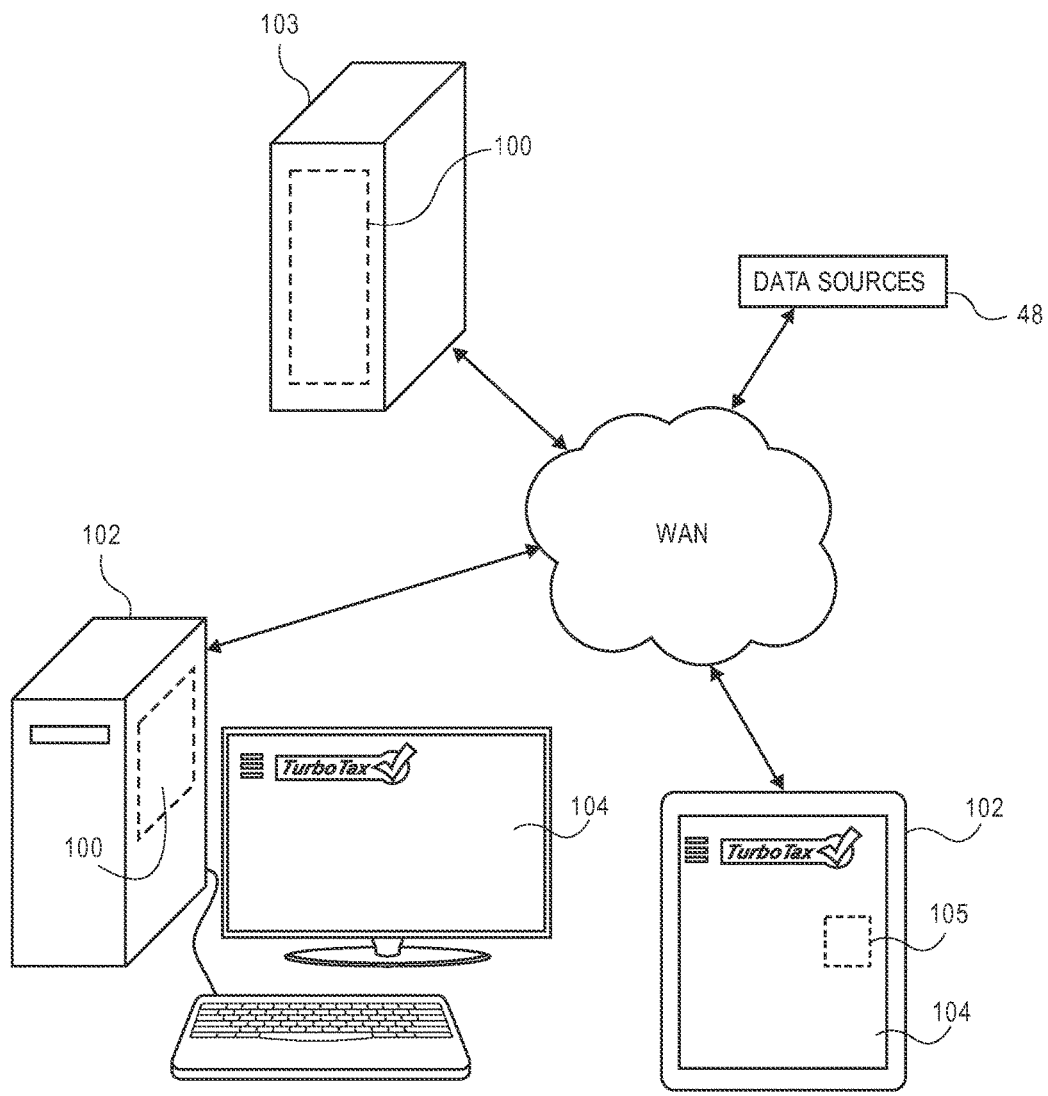
FIG. 13 illustrates the implementation of tax preparation software on various computing devices according to one embodiment.

Still referring to FIG. 7, the UI control 80 encompasses a user interface manager 82 and a user interface presentation or user interface 84. The user interface presentation 84 is controlled by the interface manager 82 may manifest itself, typically, on a visual screen or display 104 that is presented on a computing device 102 (seen, for example, in FIG. 13). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, is responsible for resolving of how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on-the-fly during runtime.

As seen in FIG. 7, the UI control 80 interfaces with the data store 42 such that data that is entered by a user (i.e., user input 48*h*) in response to the user interface presentation 84 can then be transferred or copied to the data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be request of the taxpayer. For example, with regard to donated goods, the taxpayer may be prompted to explain what the donated good are and describe the same in sufficient detail to satisfy requirements set by a particular taxing authority.

Still referring to FIG. 7, a tax return (either electronic return or paper return) is prepared by the TLA 60 or at the direction of the TLA 60. The TLA 60 is operatively coupled to a services engine 90 that is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). The services engine 90 may be used in connection with the TLA 60 to properly format the required data into proper format for electronic filing. Whether a paper or electronic return is filed, data from the data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years. The services engine 90 may be embodied as a programmed subroutine as part of the tax preparation software 100 that is executed by a processor or controller as described herein.

Figure 8A:
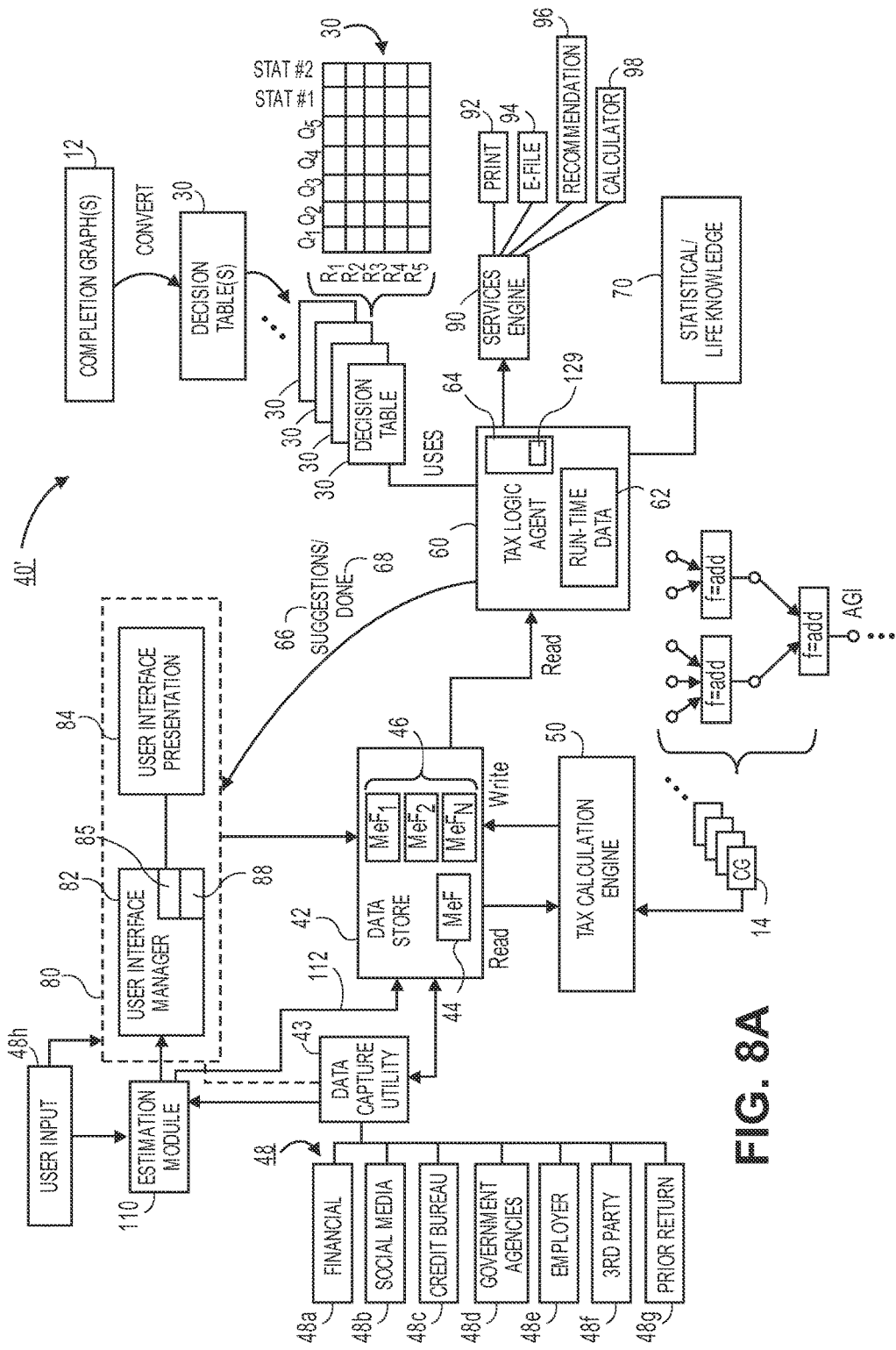
FIG. 8A schematically illustrates a system according to another embodiment for calculating taxes using rules and calculations based on a declarative data structures.

FIG. 8A illustrates another schematic illustration of a system 40' for calculating taxes using rules and calculations based on a declarative data structures. Those elements equivalent to the embodiment of FIG. 7 are labelled with the same element numbers. In this alternative embodiment, the system 40' includes an estimation module 110 that writes to the data store 42 with estimates 112 inferences, or guesses of one or more data fields contained within the data store 42. The estimates 112 or guesses may pertain to any number of tax topics and may include alphanumeric characters, a response to a Boolean operation, text, and the like. In this particular embodiment, the estimate module 110 assigns an estimated value to one or more data fields of the schema 44 contained in the data store 42. The estimated value may be obtained in a number of ways. In one aspect, user input 48*h* is used to generate the estimated value. For example, the user may be prompted by UI control 80 with a prompt 84 to enter a guess or estimate on a particular data field. In another aspect, a prior tax return or multiple tax returns can be used to generate an estimated value. For example, taxpayer A may have a history of the past three years of tax return data (e.g., stored as proprietary or standardized files) stored or otherwise made available to tax preparation software 100 that shows yearly dividend income of $1,200, $1,350, and $1,400. The estimation module 110 may generate an average of $1,317 to be used as an estimate for a current year return. Alternatively, the estimation module 110 may employ more robust analytics than merely computing an average or mean value. In the context of this example, the estimation module 110 seeing that dividends appear to be increasing in value each year may attempt to find a function (e.g., linear or non-linear function) that fits the observable data and can be used to better estimate current year tax data. For example, in the above example, a curve fitting function may estimate current year dividend at $1,525 rather than the average value of $1,317.

The estimation module 110 may use other techniques to generate estimates. For example, the estimate module 110 may use pro-ration to arrive at an estimated number. For example, assume that the data capture utility 43 captures nine months of interest income for a taxpayer. The estimation module 110 may pro-rate this over a twelve month period to estimate a full year's worth of interest income. A similar technique may be used to estimate wage income by the estimation module 110. Execution of the estimation module 110, which may be a programmed subroutine as part of the tax preparation software 100 that is executed by a processor or controller as described herein.

Various data sources 48 may also be used by the estimation module 110 to provide estimated values. Data sources 48 may be used as inputs for the estimation module 110. Data that is obtained from the data sources 48 may be temporarily written or contained within the estimation module 110 or a storage area associated therewith prior to estimates being transferred to the data store 42. Data sources 48 include, for example, a financial data source 48a, social media data source 48b, credit data source 48c, governmental agency data source 48d, employer data source 48e, third party data source 48f, and user input 48h as explained herein. The data capture utility 43 may be used to retrieve data that is provided to the estimation module 110.

Estimates may include numerical data (e.g., dividend income) but it may also include non-numerical data. For example, the estimation module 110 may estimate a user's tax filing status (e.g., married filing jointly) based on data that is obtained from one or more remotely located data sources 48. For example, the estimation module may make an inference on filing status based on postings made to an online social media account and entries made in a credit reporting database that are searched by the data capture utility 43.

It should also be understood that the estimation module 110 may rely on one or more inputs to arrive at an estimated value. For example, the estimation module 110 may rely on a combination of prior tax return data 48g in addition to, for example, data obtained from a financial data source 48a, social media data source 48b, or the like to estimate a value or condition. This may result in more accurate estimations by relying on multiple, independent sources of information. The UI control 80 may be used in conjunction with the estimation module 110 to select those sources of data to be used by the estimation module 110. For example, user input 48h will require input by the user of data using a user interface presentation 84. The UI control 80 may also be used to identify and select prior tax returns from prior tax return data 48g. Likewise, user IDs and passwords may be needed for various data sources 48 in which case UI control 80 can be used in conjunction with the data capture utility 43 needed to obtain this information from the user.

In one embodiment of the invention, the estimated values or other estimated data provided by the estimation module 110 may be associated with one or more attributes 122 as illustrated in FIG. 9. The attributes 122 may indicate a label such as a source 124 or provenance of the estimated value (e.g., user input 48h, prior tax return data 48g, financial data source 48a, social media data source 48b, and the like). In the example of FIG. 9, a source ID 124 indicates the particular source of the data that is used for the field. For example, source ID 01 may correspond to user input 48h. Source ID 03 may correspond to a data 48g from a prior year tax return. Source ID 05 may correspond to an employer data source 48e while source ID 06 corresponds to a credit data source 48c.

The attributes 122 may also include a confidence level 126 associated with each estimated field. The confidence level 126 is indicative of the level of trustworthiness of the estimated user-specific tax data and may be expressed in a number of different ways. For example, confidence level 126 may be broken down to intervals (e.g., low, medium, high) with each estimated value given an associated label (e.g., L—low, M—medium, H, high). Alternatively, confidence levels 126 may be described along a continuum without specific ranges (e.g., range from 0.0 to 1.0 with 0.0 being no confidence and 1.0 with 100% confidence). The confidence level 126 may be assigned based on the source of the estimated user-specific tax data (e.g., source #1 is nearly always correct so estimated data obtained from this source will be automatically assigned a high confidence level).

In some embodiments, the estimation module 110 may acquire a plurality of estimates from different sources (e.g., user input 48h, prior year tax return data 48g, financial data sources 48a, social media data sources 48b) and only write the "best" estimate to the data store 42 (e.g., the source with the highest confidence level 126). Alternatively, the estimation module 110 may be configured to ignore data (e.g., sources) that have confidence levels 126 below a pre-determined threshold. For example, all "low" level data from a source may be ignored. Alternatively, all the data may be stored in the data store 42 including, for example, the attribute 122 of the confidence level 126 with each entry. The tax calculation engine 50 may ignore data entries having a confidence level below a pre-determined threshold. The estimation module 110 may generate a number of different estimates from a variety of different sources and then writes a composite estimate based on all the information from all the different sources. For example, sources having higher confidence levels 126 may be weighted more than other sources having lower confidence levels 126.

Still referring to FIG. 9, another attribute 122 may include a confirmation flag 128 that indicates that a taxpayer or user of the tax preparation software 100 has confirmed a particular entry. For example, confirmed entries may be given an automatic "high" confidence value as these are finalized by the taxpayer. Another attribute 122 may include a range of values 130 that expresses a normal or expected range of values for the particular data field. The range of values 130 may be used to identify erroneous estimates or data entry that appear to be incorrect because they fall outside an intended range of expected values. Some estimates, such as responses to Boolean expressions, do not have a range of values 130. In this example, for example, if the number of estimates dependents is more than five (5), the tax logic agent 60 may incorporate into the rules engine 64 attribute range information that can be used to provide non-binding suggestions to the UI control 80 recommending a question to ask the taxpayer about the high number of dependents (prompting user with "are you sure you have seven dependents"). Statistical data may also be used instead of specific value ranges to identify suspect data. For example, standard deviation may be used instead of a specific range. When a data field exhibits statistical deviation beyond a threshold level, the rules engine 64 may suggest a prompt or suggestion 66 to determine whether the entry is a legitimate or not. Additional details regarding methods and systems that are used to identify suspect electronic tax data may be found in U.S. Pat. No. 8,346,635 which is incorporated by reference herein.

In one embodiment, the data store 42 may receive data from multiple sources. For example, the data capture utility 43 may capture data that is transferred to the data store 42 while the estimation module 110 provides estimates 112 to the data store 42 for other portions of the schema 44. User input 48*h* may also be transferred to the data store 42. The estimation module 110 may work in conjunction with the data capture utility 43 to capture relevant needed to populate the data store 42. For example, the data capture utility 43 may capture from a financial data source 48*a* a number of dividend transactions occurring in an investment account throughout all or a portion of the tax year. The completed 1099-DIV tax form may not be available yet from the particular financial service provider that has the financial data source 48*a* yet the estimation module 110 can be used to estimate the total dividend amount for the tax year and transfer the estimate 112 to the data store 42. As another example, the estimation module 110 may use prior tax return data 48*g* to estimate values to be transferred to the data store 42.

It should be understood that the estimation module 110 not only can estimate values (i.e., numerical amounts) but the estimation module 110 is also able to estimate various states or conditions that have tax implications. For example, the estimation module 110 may be able to estimate or predict your tax filing status based on data found, for example, in credit data obtained in the credit data source 48*c* or through analysis of a data contained within a social media data source 48*b* (e.g., online profile status indicates married and estimation module 110 indicates to data store 42 that tax payer is filing jointly with a spouse).

Referring back to FIG. 8A, in this embodiment, the tax logic agent 64 includes within or as part of the rules engine 64 attribute rules 129 that are incorporated and used to generate the non-binding suggestion. For example, as explained above, when an estimated value is input or otherwise transferred to the shared data structure 42, this estimated value may fall outside a generally accepted range of values. This may prompt the TLA 60 to suggest a confirmatory question to the UI control 80 to confirm the accuracy of the estimated value that has been obtained. Likewise, various data fields may be associated with a low level of confidence as seen in FIG. 9. Questions relating to tax topics that incorporate these low confidence fields may be promoted or otherwise ranked higher so that accurate values may be obtained from the taxpayer. Conversely, if a particular estimated tax field is associated with a high level of confidence, questions concerning this field may be demoted to a lower importance using the attribute rules 130. For example, multiple fields with a high level of confidence could be presented to the user in a single interview screen to confirm the accuracy of this information without the need to walk through individual questions.

In some embodiments, each estimated value produced by the estimation module 110 will need to be confirmed by the user using the UI control 80. For example, the user interface manager 82 may present estimated data fields to the user for confirmation or verification using a user interface presentation 84. In other embodiments, however, the user may override data using the user interface presentation 84. Some estimated data, for example, data having a high confidence level 126 may not need to be confirmed but can be assumed as accurate.

Figure 10:
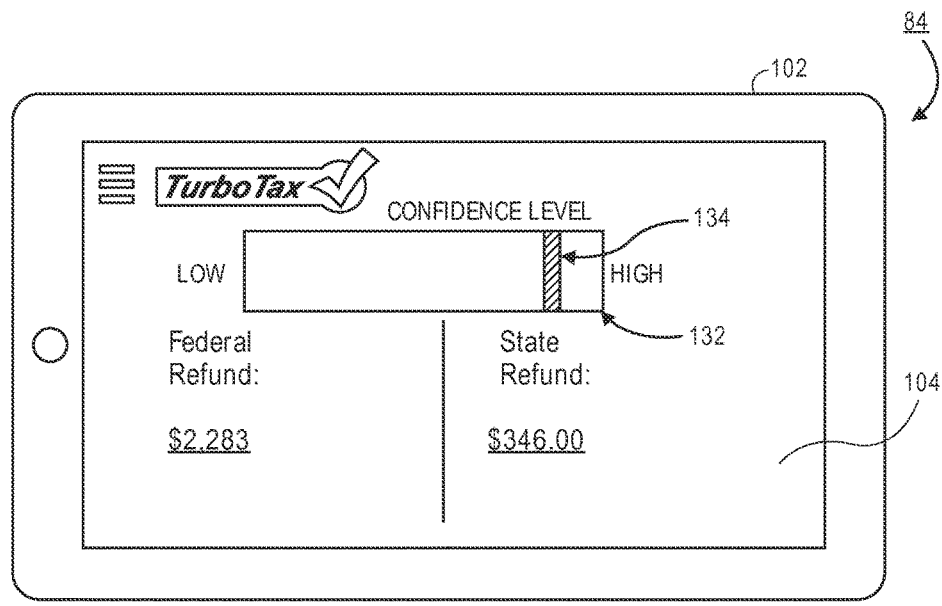
FIG. 10 illustrates a computing device with an illustrative user interface presentation that incorporates the attribute rules to arrive a confidence level for tax calculations according to one embodiment.

FIG. 10 illustrates an illustrative user interface presentation 84 on a computing device 102 that incorporates the attribute rules 130 to arrive a confidence level for tax calculations. The user interface presentation 84 appears on a screen 104 of the computing device 102. As seen in FIG. 10, the dollar amount of the calculated federal refund in listed along with the refund amount of the calculated state refund. The user interface presentation 84 includes a confidence level indicator 132. The confidence level indicator 132 indicates the overall or aggregate confidence level in the tax calculation. The tax calculation could include a refund amount as illustrated in FIG. 10 but it may also include a taxes due amount. In the example given in FIG. 10, the confidence level indicator 132 is expressed as a bar 134 in a bar meter type implementation.

Figure 11:
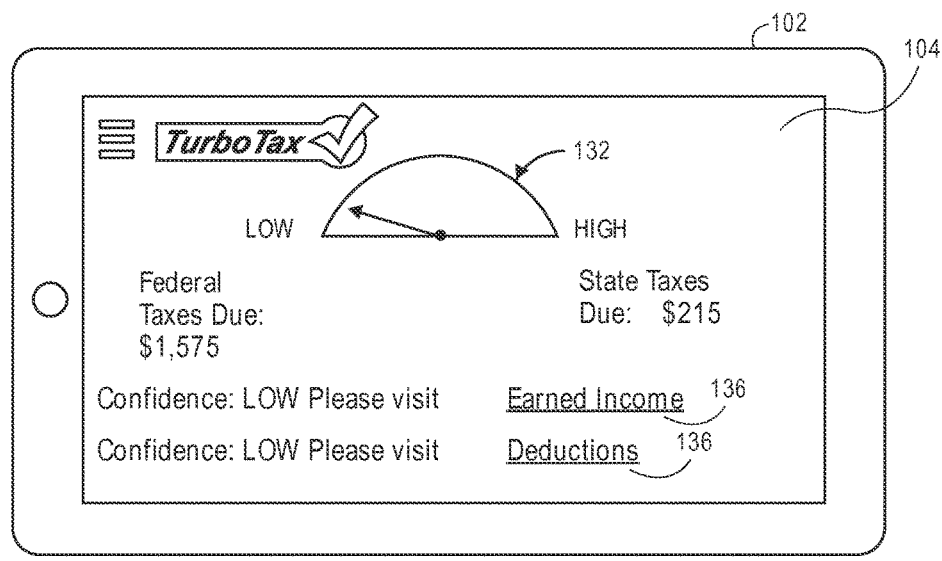
FIG. 11 illustrates a computing device with another illustrative user interface presentation that incorporates the attribute rules to arrive a confidence level for tax calculations according to another embodiment.

The confidence level indicator 132 may take a number of different forms, however. For example, the confidence level indicator 132 may be in the form of a gauge or the like that such as that illustrated in FIG. 11. In the example, of FIG. 11, the confidence level indicator 132 is indicated as being "low." Of course, the confidence level indicator 132 may also appear as a percentage (e.g., 0% being low confidence, 100% being high confidence) or as a text response (e.g., "low," "medium," and "high" or the like). Other graphic indicia may also be used for the confidence level indicator 132. For example, the color of a graphic may change or the size of the graphic may change as a function of level of confidence. Referring to FIG. 11, in this instance, the user interface presentation 84 may also include hyperlinked tax topics 136 that are the primary sources for the low confidence in the resulting tax calculation. For example, the reason that the low confidence is given is that there is low confidence in the amount listed on the taxpayer's W-2 form that has been automatically imported into the data store 42. This is indicated by the "LOW" designation that is associated with the "earned income" tax topic. In addition, in this example, there is low confidence in the amount of itemized deductions being claimed by a taxpayer. This is seen with the "LOW" designation next to the "deductions" tax topic. Hyperlinks 136 are provided on the screen so that the user can quickly be taken to and address the key drivers in the uncertainty in the calculated tax liability.

Figure 8B:
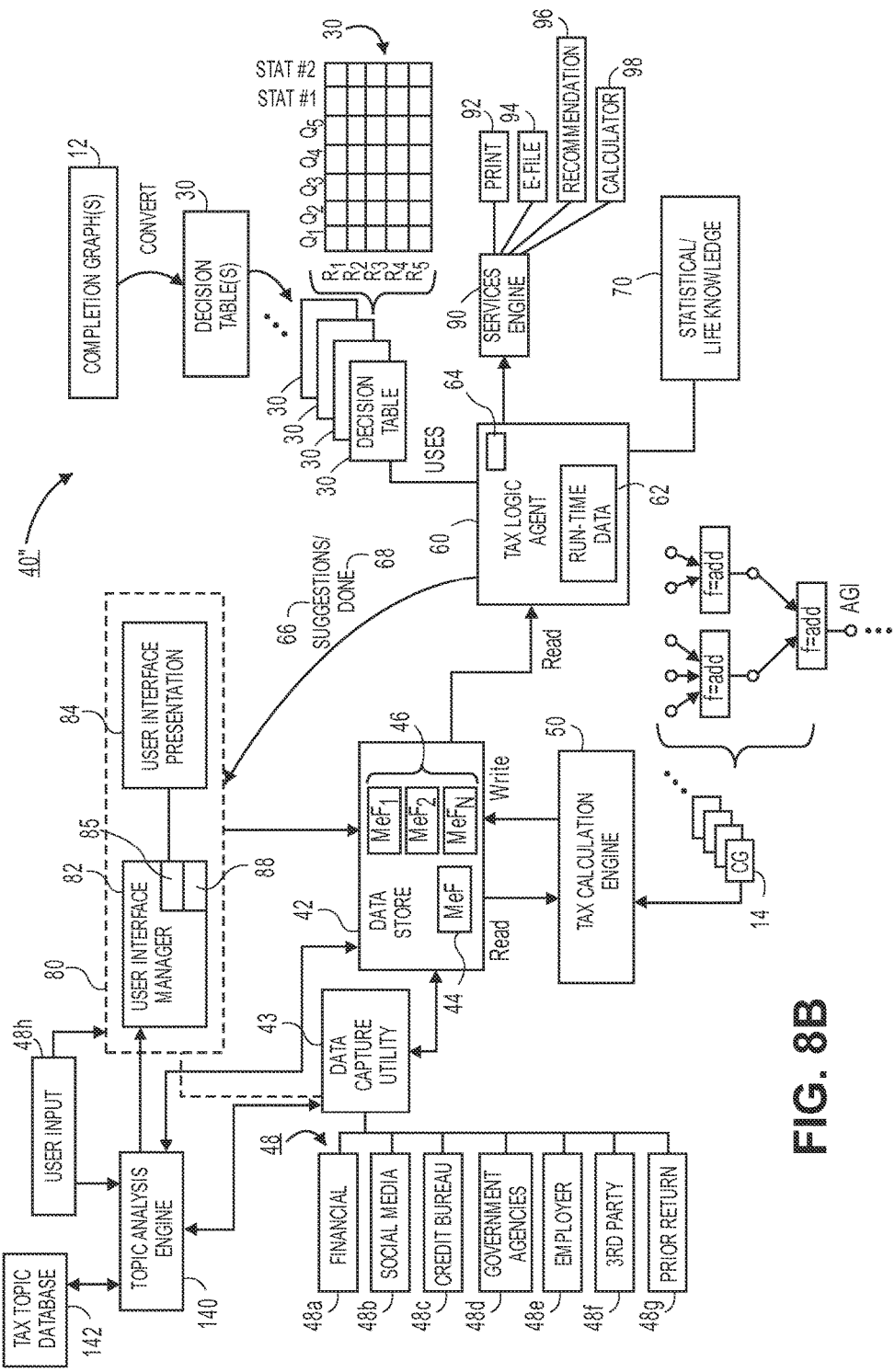
FIG. 8B schematically illustrates a system according to another embodiment for calculating taxes using rules and calculations based on a declarative data structures. In this embodiment, a topic analysis engine is used to aid in generating interview questions for highly relevant tax topics or automatically obtaining highly relevant information from one or more online resources.

FIG. 8B illustrates another schematic illustration of a system 40" for calculating taxes using rules and calculations based on a declarative data structures. Those elements equivalent to the embodiment of FIG. 7 are labelled with the same element numbers. In this alternative embodiment, the system 40" includes a topic analysis engine 140. The topic analysis engine 140 is executed by the computing device 102, 103 and is configured to identify tax topics that are highly relevant to the user. The topic analysis engine 140 may identify tax topics that are highly relevant in response to user input 48*h*. For example, preliminary questions regarding the user's occupation, residence, filing status, and other basic information may be used to generate a user profile as explained herein that can be used to flag specific tax topics of interest that are likely to apply to the taxpayer. To this end, a database 142 is linked to the topic analysis engine 140 and may contain information on past or current taxpayers that can be queried or otherwise utilized by the topic analysis engine to identify relevant topics (see, for example, database 502 in FIG. 24). After relevant tax topics of interest have been identified, the user interface manager 82 may generate relevant interview questions or screens that are shown to the user to develop data for these topics. Alternatively, one or more remote data sources 48 can be accessed using the data capture utility 43 to obtain the highly relevant tax data. Rather than asking the user interview questions, the data capture utility 43 is able access the applicable remote data sources 48 for this information. If additional information is needed, interview questions can be generated by the user interface manager 82. In another example, the data capture utility 43 may be used to analyze prior tax returns. The topic analysis engine 140 can examine the data from prior tax returns to identify those tax topics that are highly relevant. The topic analysis engine 140 may then communicate those identified topics to the user interface manager 82.

Still referring to FIG. 8B, for those tax topics that are deemed to have low relevance, the data store 42 may be informed of this decision by, for example, giving a particular data field corresponding to this information with a flag or giving the filed a zero or null value. This information can be read by the tax logic agent 60 so that completion graphs 12 can be minimized or otherwise reduced if this information is not needed. Of course, at some point the tax topics that are "ignored" will have to be presented to the user to verify or confirm that the tax topic does not apply. This can be done efficiently, however, because these topics can be summarized or aggregated (e.g., list) and presented to the user in a format that allows for easy confirmation/verification.

Figure 12:
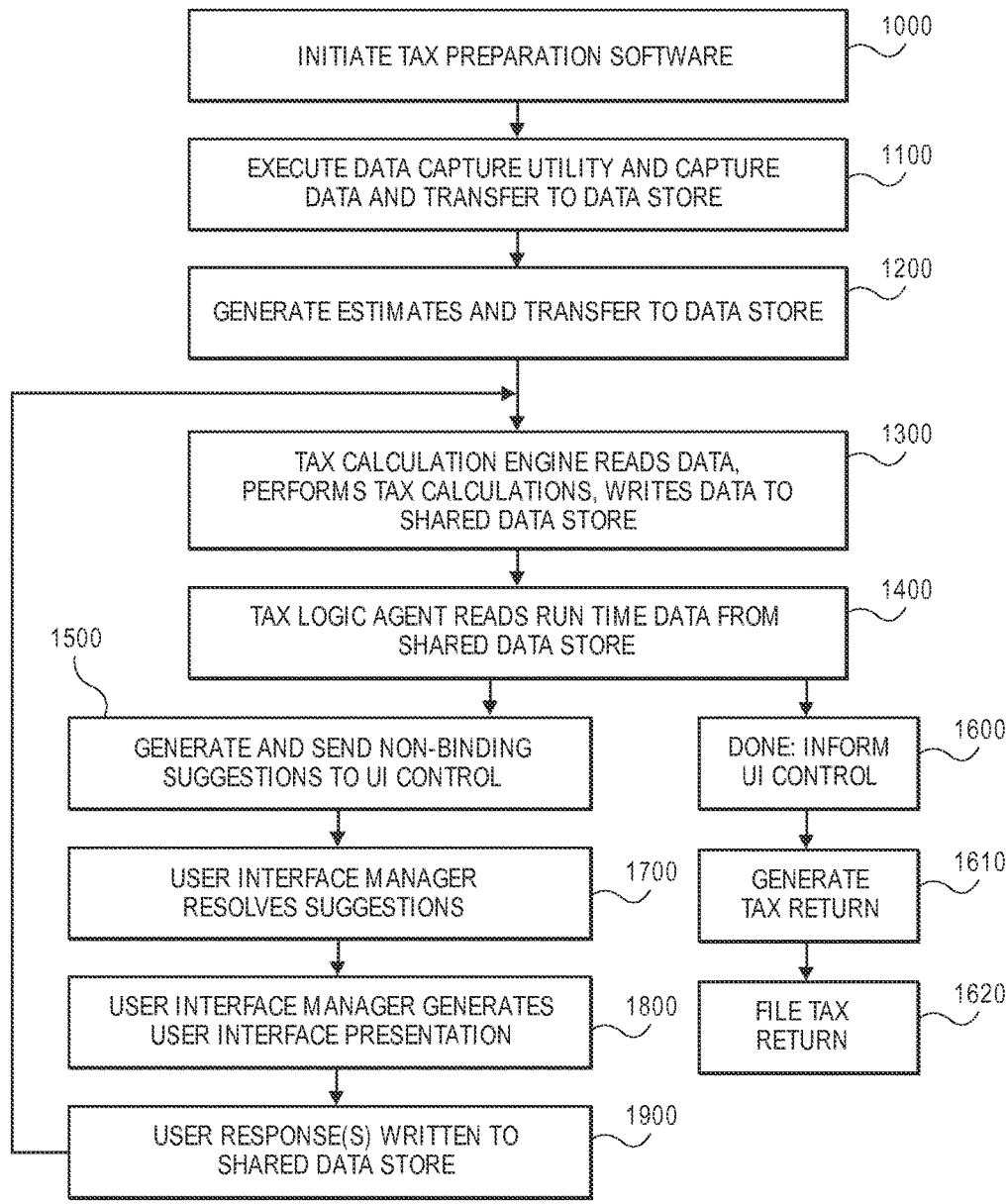
FIG. 12 illustrates a flowchart of operations used in connection with a method of calculating tax liability according to one embodiment.

FIG. 12 illustrates the operations of one illustrative method for calculating tax liability according to an embodiment of the invention. In operation 1000, a user initiates the tax preparation software 100 on a computing device 102, 103, as seen, for example, in FIG. 13. The tax preparation software 100 may reside on the actual computing device 102 that the user interfaces with or, alternatively, the tax preparation software 100 may reside on a remote computing device 103 such as a server or the like as illustrated. In such an instances, the computing device 102 that is utilized by the user or tax payer communicates via the remote computing device 103 using an application 105 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

Referring back to FIG. 12, after initiating the tax preparation software 100, the tax preparation software 100, in operation 1100, executes the data capture utility 43. The data capture utility 43 connects to the one or more data sources 48 as described herein and captures (e.g., through screen scraping techniques) tax data and transfers the same to the data store 42. Note that the gathering of tax related data from the one or more data sources 48 may occur at the time the tax preparation software 100 is run. Alternatively, the gathering of tax related data from the one or more data sources 48 may occur over a period of time. For example, data sources 48 may be periodically queried over time (e.g., during a tax reporting year) whereby updated information is stored in a database (not shown) or the like that is then accessed by the tax preparation software 100. This option may improve the efficiency and speed of tax return preparation as the information is already available. Thus, in some embodiments, the data capture utility 43 may have captured data even prior to the current execution of the tax preparation software 1000.

In one embodiment, the data capture utility 43 provides the user via the user presentation 84 with a listing or grouping of different user accounts that can be searched by the data capture utility 43. In one aspect of the invention, the user selects his or her accounts that are to be queried by the data capture utility 43. For instance, a series of pull down menus can be provided on the user presentation for various categories of data sources 48. For example, a user may be provided with a listing of financial service providers (e.g., financial data source 48a). These may include financial institutions where the user has a bank account, credit union account, investment account, and the like. The user can also select his or her social media accounts (e.g., social media data source 48b). Likewise, the user may be asked to provide or select from a list his or her employer. Once the relevant data sources 48 have been identified, the user will enter his or her authentication credentials. Typically this includes, for example, a user ID and password. In other instances, the user may be asked for other information such as name, employee number, or social security number. FIG. 15 illustrates a view of a computer 102 and associated display that illustrates a number of different data sources 48 that have been selected to be interrogated by the data capture utility 43.

A user may be given the opportunity to select which data sources 48 they want accessed and searched for relevant tax related data that will be imported into the data store 42. A user may be asked to submit his or her account and password information for some data sources 48 using the UI control 80. Other data sources 48 such as some third party data sources 48f or government agency data sources 48d may be accessed without such information. Prior tax return information (e.g., prior return data source 48g) may be found by the data capture utility 43 by, for example, searching a local storage device for designated file types. Of course, this search could also be performed on a remote or cloud based storage device that may have prior tax return data stored therein.

Still referring to FIG. 12, in one embodiment, the estimation module 110 is executed as seen in operation 1200 whereby one or more estimates are generated and transferred to the data store 43. It should be understood, however, that the estimation module 110 is an optional feature and may not be utilized in some embodiments. After the schema 44 is populated with the various captured and transferred data fields from the data sources 48, the tax calculation engine 50, using the calculation graphs 14, reads data from the data store 42, performs tax calculations, and writes back data to the data store 42 (operation 1300). The schema 44 may also be populated with estimates or educated guesses as explained herein using the estimation module 110 as described in the context of the embodiment of FIG. 8A. In operation 1400, the tax logic agent 60 reads the run time data 62 which represents the instantiated representation of the canonical tax schema 44 at runtime. The tax logic agent 60 then utilizes the decision tables 30 to generate and send non-binding suggestions 66 to the UI control 80 as seen in operation 1500. Alternatively, the tax logic agent 60 may determine that completeness has been achieved across the tax topics in which case a done instruction may be delivered to the UI control as seen in operation 1600. The done instruction indicates that completeness has been achieved and a fileable tax return can be prepared based on the data contained within the data store 42. In operation 1610, a tax return is then generated by the tax preparation software 100 using, for example, the services engine 90. In the event the tax return that is generated is an electronic tax return, the tax preparation software 100 can then file the tax return with the appropriate taxing authorities as illustrated in operation 1620.

If there is not enough information in the data store 42 for fileable tax return, there is no "done" instruction and the process continues whereby the user interface manager 82 will then process the suggestion(s) 66 using the suggestion resolution element 88 for resolving of how to respond to the incoming non-binding suggestions 66 as seen in operation 1700. The user interface manager 82 then generate a user interface presentation 84 to the user as seen in operation 1800 whereby the user is presented with one or more prompts. The prompts may include questions, affirmations, confirmations, declaratory statements, and the like. The prompts are displayed on a screen 104 of the computing device 102 whereby the user can then respond to the same by using one or more input devices associated with the computing device 102 (e.g., keyboard, mouse, finger, stylus, voice recognition, etc.).

Still referring to FIG. 12, as seen in operation 1900, the response or responses (e.g., user inputs 18h) that are given by the user of the tax preparation software 100 are then written back to the data store 42 to thereby update all appropriate fields of the schema 44. The process then continues with operation 1300 and proceeds as explained above until a completeness state has been reached and a done instruction is sent to the UI control 80.

Figure 14:
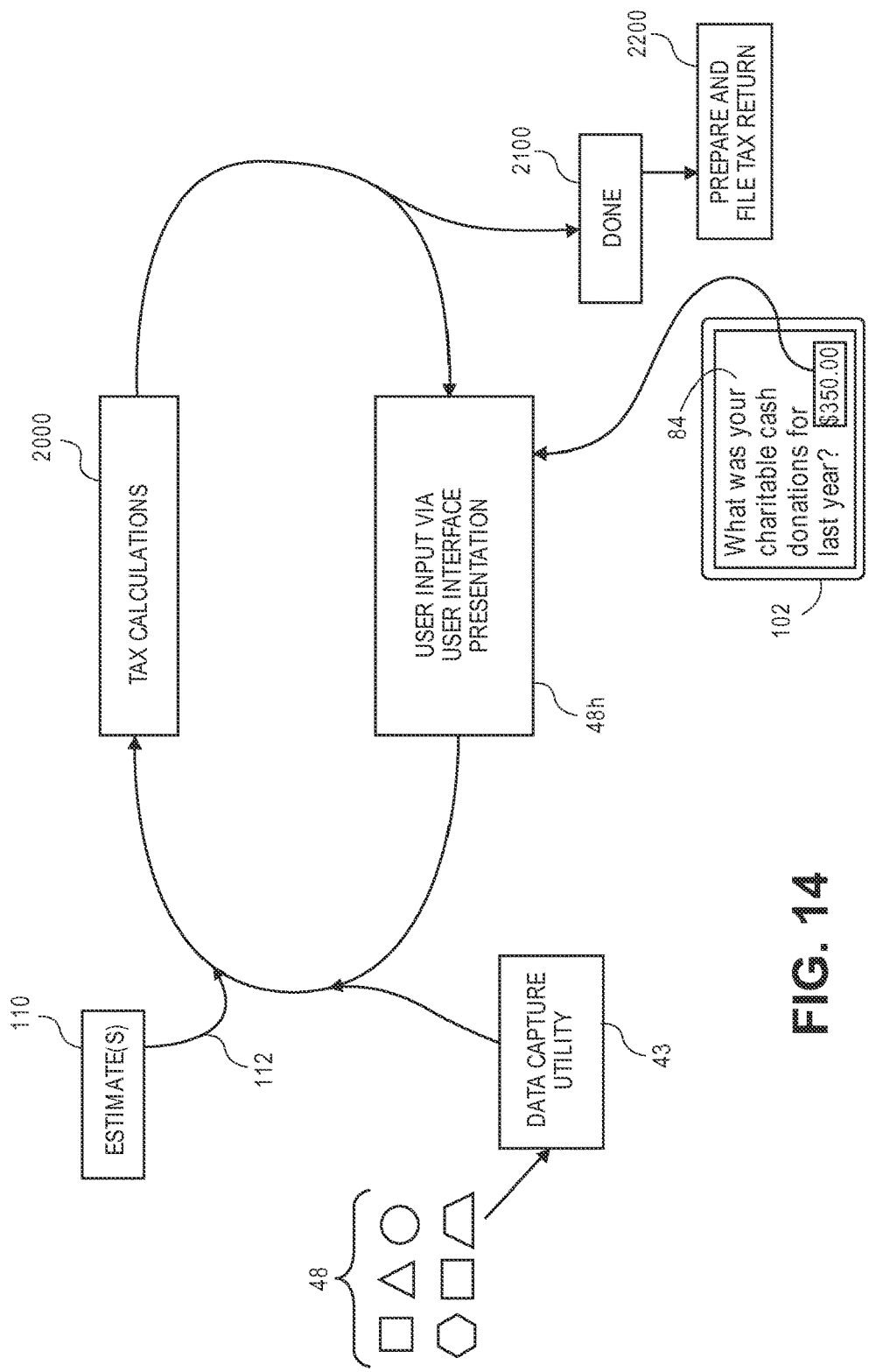
FIG. 14 schematically illustrates a process whereby a combination of user inputs, sourced data, and estimates are used in connection with a tax calculation according to one embodiment.

FIG. 14 illustrates a schematic representation of one preferred embodiment of the invention in which user input via the user interface presentation 84 is minimized. As seen in FIG. 14, tax calculations 2000 are performed based on a number of inputs including data that is captured from the data capture utility 43 and, optionally, the estimation module 110. User inputs 48h are input using the user interface presentation 84 that appears on the computing device 102, 103. It should be noted that tax calculations 2000 can be made even though there may be some missing data entry that is not incorporated into the tax calculation 2000. While the tax return may not be in a condition to be filed, the tax liability or a sub-component thereof (e.g., total itemized deductions, or gross income) can often be calculated. The manually entered user inputs 48h are combined with the automatically gathered data from the data capture utility 43 and the optional estimation module 110. In one aspect of the invention, a large portion of data needed for the calculation and preparation of taxes is obtained by the data capture utility 43. For example, in one aspect of the invention, more than 20% of the user-specific data required to prepare a fileable tax return is obtained by the data capture utility 43. In other embodiments, this number is even higher (e.g., higher than 40%). The higher the percentage of data that is obtained by the data capture utility 43 translates into less manual entry of data using user input 48h.

The user input 48h aspect may be minimized by first populating relevant fields using data obtained from the data capture utility 43 or estimates 112 provided by the estimate module 110. The user input 48h may be used to input missing data that was not otherwise obtained. User input 48h, however, may also be used to verify estimates or verify sourced data. For example, prior to being incorporated into tax calculations (e.g., stored within the data store 42), the user may be prompted to accept, reject, or alter the values of data obtained from the data capture utility 43 or estimates 112 generated by the estimate module 110. User 48h may also be used to resolve conflicts. For example, the data capture utility 43 may obtain sourced data 48 that may conflict with estimates 112 and user input 48h may be required to resolve the conflict. User input 48h may also be used to accept or reject sourced data from the data capture utility 43 or estimates 112. For example, a user may know that a particular estimate 112 is incorrect and plans to input this particular value manually. FIG. 14 illustrates that after sufficient data has been entered manually, captured using the data capture utility 43, or estimated via estimation module 110, no additional data is required to compute a user's tax liability as illustrated in operation 2100. The tax preparation software 100 can then prepare and file (if e-file form) the tax return with the appropriate tax authorities as illustrated in operation 2200.

FIG. 15 illustrates a computing device 102 that is used in one mode to select the various accounts that will be accessed by the data capture utility 43. In this example, the computing device 102 has a display 104 whereby the user will identify, select, or input her account information for various accounts that will be accessed by the data capture utility 43. In one optional embodiment, the user will be presented with listing or pull down menu of available sources that be accessed by the data capture utility 43. The sources may be grouped or otherwise organized by type (e.g., banking accounts, investment accounts, social media accounts, etc.). In the example illustrated in FIG. 15, the user has entered her authentication information for a bank account 200, an investment account 202, two social media accounts 204, 206, and information pertaining to her employer 208.

As seen in FIG. 15, the computing device 102 connected to a remote computing device 103 that is running the tax preparation software 100 via a network connection via a wide area network 205 such as the Internet. In this configuration, the local computing device 102 may connect to the remote computing device 103 using an application or using, for example, a browser utility. In this embodiment, the remote computing device 103 executes the data capture utility 43 which accesses the various online accessible accounts that include data sources 48a, 48b, 48c, 48d, 48e, and 48f. For example, financial data source 48a is accessed to capture tax data obtained from the CHASE banking account 200. Social media data sources 48b are accessed by the data capture utility 43 for the two social media accounts 204, 206. Credit data source 48c may be searched without any user authentication provided by the user. The same applies to government agency data source 48d and third party data source 48f. In this example, an employer data source 48e is searched by the data capture utility 43 because the user provided information on her employer 208.

Still referring to FIG. 15, the data capture utility 43 accesses the data sources 48a, 48b, 48c, 48d, 48e, and 48f and collects the relevant financial and/or personal data for the user and transfers this information to the data store 42. As explained herein, this can be accomplished using screen scraping techniques or specialized bots or crawling programs, or an API and extract this information. In the example illustrated in FIG. 15, the data capture utility 43 captures and stores within the data store 42 interest income 210, capital gains 212, dividend income 214, W-2 income 216, filing status 218, and also establishes a flag 220 for a possible mortgage deduction for the taxpayer.

As one can see from this example, a wide variety of tax-related data is obtained from a number of disparate sources using the data capture utility 43. This data is now available within the data store 42 such that tax computations can be performed without need for the user to manually enter these entries into the tax software program 100. In addition, as seen in the example of FIG. 15, a flag 220 has been established with respect to whether the user can take advantage of a mortgage deduction. This flag 220 may be set when the data capture utility 43 finds one or more indicia of home ownership. For example, the data capture utility 43 may search the social media data sources 48b and find a posting that includes the text "our new home."

The data capture utility 43 may trigger the flag 220 which indicates that there may be one or more tax deductions or credits available to the user that relate to homeownership. In another example, the data capture utility 43 may search a credit data source 48c that indicates that the owner has a mortgage associate with her credit report. The flag 220 may be set because of this discovery by the data capture utility 43. The data capture utility 43 may trigger flags based on text comparisons or searching performed on obtained data from data sources 48. The data capture utility 43 may also trigger flags 218 based on numerical amounts, codes, and identifiers contained or associated with data in the data sources 48. For example, a high loan balance may be indicative of a mortgage even though there may be no text associated within the balance in a data source 48.

Still referring to FIG. 15, the TLA 60 is illustrated as posing a suggestion 66 to the user based on the flag 220. In this example, the suggested question is "did you purchase a home this past year" which is presented to the user. This question was prompted by the discovery of data by the data capture utility 43 that would tend to indicate that the user moved into a new home within the current tax year. While the above-example has been given in the context of home ownership it is not so limited. For example, social media data sources 48b corresponding to social media accounts 204, 206 can be searched to determine whether the user changed jobs during a tax year. For example, the employment history of the user's LINKED-IN social media account 206 may be mined where dates of employment indicate that the user held multiple jobs during the tax year. The data capture utility 43 can then issue a flag 220 that would alert the software program 100 (e.g., TLA 60) that questions about multiple jobs held by the user should be asked to the user.

FIG. 16 illustrates another mode of the invention. In this embodiment, the user has an account with personal finance software 250 such as MINT. MINT is an online-based personal finance software program 250 that runs using a remotely accessible computer 252 via a browser or application. In this example, the user is prompted via a user interface 254 as illustrated in FIG. 16 for the tax preparation software 100 to enter his or her MINT ID and password. Personal financial software such as MINT is already linked to various personal accounts such as banking, investment, property, debt, and the like. In this embodiment, the data capture utility 43 executed by the remote computing device 103 can capture personal financial information from data that is already collected (e.g., scrapped) by the personal finance software 250. Typically, personal finance software 250 such as MINT will periodically access the designated online accounts to pull account balance information as well as recent transactions which can then be viewed by the user.

In this example, the process is streamlined in that the user does not have to enter the ID and password for each account as was done in the mode of FIG. 15. Instead, the user enters a login ID and password for the personal finance software program 250 and the data capture utility 43 is able to capture and transfer the relevant data to the data store 42. Of course, there may be still other data sources 48 that have relevant information that is not already linked or captured by the personal finance software program 250. In such situations, the user can identify those accounts as was described in the context of FIG. 15 whereby the data capture utility 43 can then capture and transfer relevant tax data to the data store 42. In the embodiment of FIG. 16, the data capture utility 43 has captured several relevant fields used in computing a tax liability. These include long term capital gains 260, short term capital gains 262, mortgage interest 264, and property taxes 266. A flag 268 has been set about moving expenses. For example, in this particular example, the data capture utility 43 may have found that during the tax year the user moved residence locations. This may be discovered through data obtained in a credit data source 48c or social media data source 48b. If the change in residence was caused due to job change and otherwise met the required IRS rules, some of these expenses could be deductible. As shown in this example, a proposed question 66 is generated by the TLA 60 to ask the user about whether he or she moved due to a new job.

Figure 17:
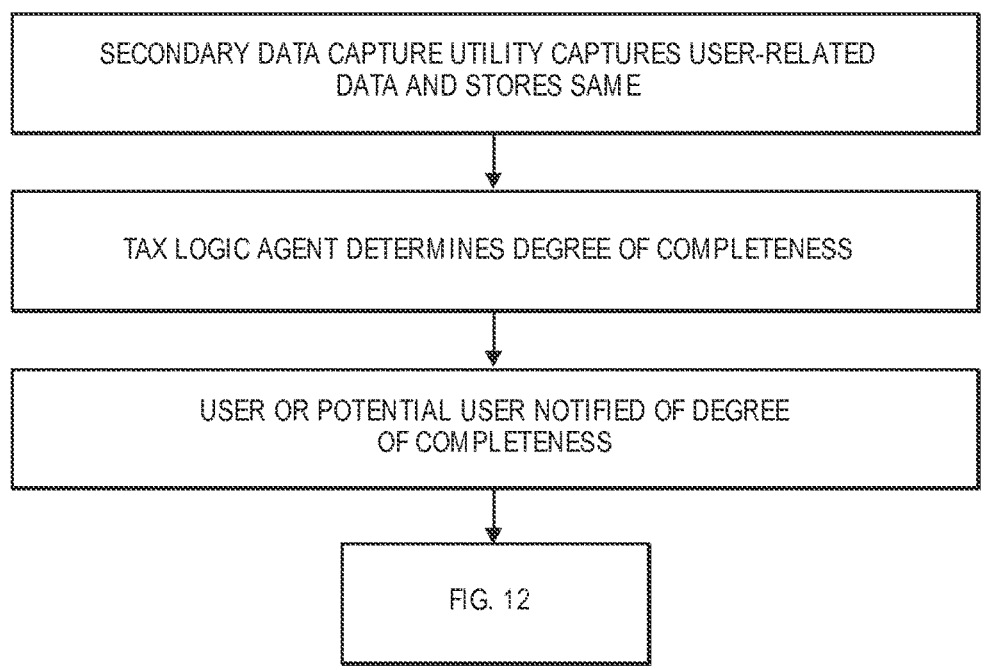
FIG. 17 illustrates the operations performed using a secondary data capture utility according to one alternative embodiment.
Figure 18:
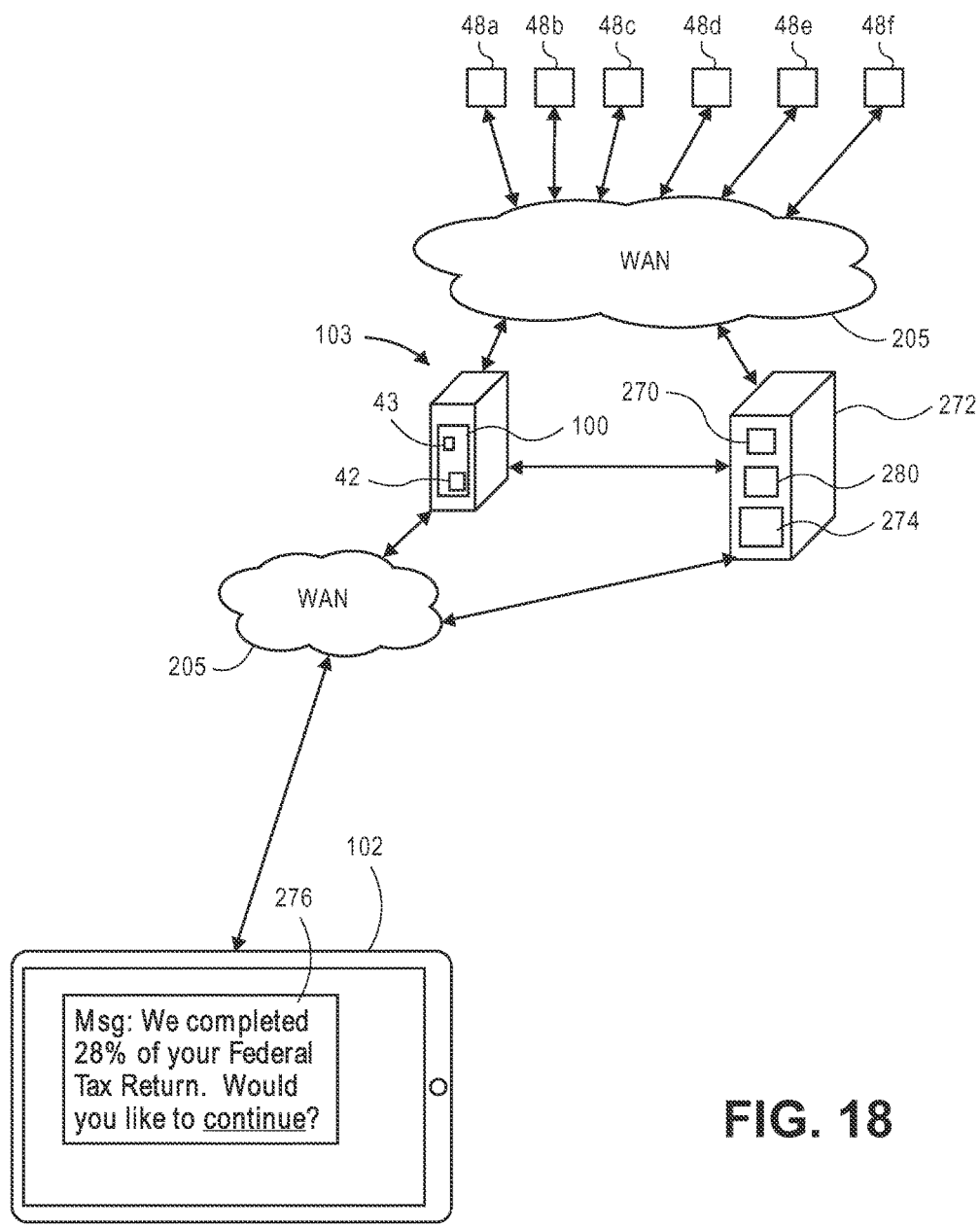
FIG. 18 schematically illustrates a system for capturing user-related tax data for use with tax preparation software according to another embodiment.

FIGS. 17 and 18 illustrate another embodiment of the invention. In this embodiment, user-related information is collected by a secondary data capture utility 270 (seen in FIG. 18) run on computer 272 that is independent from the data capture utility 43 associated with the tax preparation software program 100. Other elements similar to that illustrated in FIG. 16 retain the same element numbers in FIG. 17. The secondary data capture utility 270 does not require any input from a user to run or operate and in this regard is independent of any user input. As seen in operation 2500 of FIG. 17 and illustrated in the system of FIG. 18, the secondary data capture utility 270 captures user-related tax data and stores the same in a storage area 274. As seen in FIG. 18, storage area 274 may be accessible by the remote computer 103 such that information that is stored in the storage area 274 may be transferred or copied to the data store 42. The user-related tax data may be stored, for example, in a database or other storage area known to those skilled in the art. The user-related tax data may be obtained from publicly available data sources 48 or paid data sources such as a third party data source 48f or a credit data source 48c. Publicly available data sources 48 may include, by way of illustration and not limitation, social media data sources 48b, government agency data sources 48d, blog posts, web postings, web clippings, and the like.

In this embodiment, a tax logic agent 280 operates on the stored data contained in the storage area 274 to determine a degree of completeness for a particular tax return as seen by operation 2600 in FIG. 17. The degree of completeness refers to how much data has been gathered by the secondary data capture utility 270 as compared to the total data required to file a complete tax return. For example, in one particular embodiment, the secondary data capture utility 270 may be able to acquire 20% of the data needed to file a completed tax return. This 20% may be based, for example, on the data required to complete a fileable tax return as determined by the completeness graphs 12 as explained herein. In this embodiment, it may be preferably to acquire as much data as possible about the user so as to limit any subsequent manual entry or necessity to enter user account and password information as described in prior embodiments. For example, while 20% was given in the example listed herein, it may be preferable to have even a higher percentage captured by the secondary data capture utility 270.

Still referring to FIG. 17, in operation 2700, the user or potential user is notified of the degree of completeness via a message 276. For example, a user or potential user may receive an electronic notification such as an e-mail, text, pop-up message, voicemail message, SMS text, proprietary text (e.g., WhatsApp), Tweet using a service such as Twitter, or the like that indicates the degree of completeness that has been achieved by data obtained from the secondary data capture utility 270. This notification may be communicated by either the remote computer 103 or the computer 272 running the secondary data capture utility 270. The message 276 may be communicated by a message utility or program that is executed by the remote computer 103 or the computer 272. The notification may arise as a pop-up message 276 that is seen in the screen of a user that is visiting a website for the tax preparation software 100. Alternatively, the message 276 may be seen when a user is accessing his or her financial management software. For example, a user or potential user may receive a message 276 as illustrated in FIG. 18 that says "we completed 28% of your tax return for you, would you like to continue working on your return." The message 276 does not necessarily have to include a numerical indicator of completeness (e.g., a percentage or other numerical indicator). The message 276 may also just generally describe the degree of completion. For example, the message 276 may say that "some" or "most" of the data required to prepare and file a tax return has already been obtained. This message could be sent to pre-existing users of the tax preparation software 100. Alternatively, this message could be sent to persons who do not already use tax preparation software 100 and may be a marketing tool to encourage user to purchase or obtain a subscription to use the tax preparation software 100. For example, a potential user knowing that a portion of his or her tax return is already completed may find such an option particularly attractive.

As seen in FIG. 17, the process may continue with the operations outlines in FIG. 12. For example, the user may purchase or subscribe to the tax preparation software 100 and then use the primary data capture utility 43 to obtain user related tax data that was not already obtained by the secondary data capture utility 270. Alternatively, the user may already have purchased or subscribed to the tax preparation software 100 and the user may just be notified that a portion of his or her tax return has already been completed as now available now for access.

Note that in an alternative embodiment, the data capture utility 43 of the remote computer 103 that contains the tax preparation software 100 may be used in lieu of the secondary data capture utility 270. In such an alternative embodiment, the data obtained thereby may be stored in the data store 42. In this alternative embodiment, the computer 272 may be omitted entirely with the remote computer 103 and software contained therein running all operations. In this embodiment, the TLA 60 may be used to determine degree of completeness.

Figure 19:
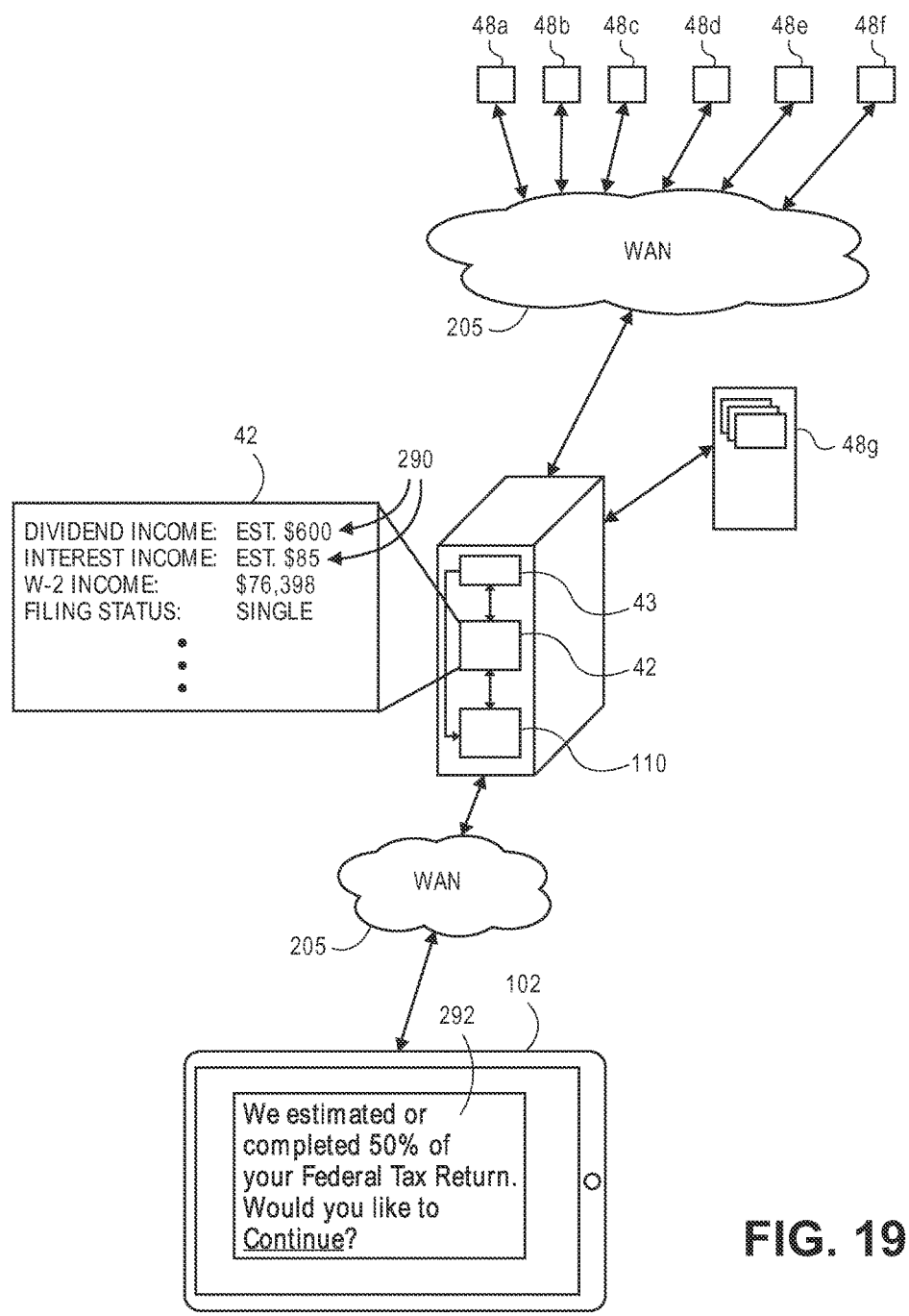
FIG. 19 schematically illustrates a system for capturing user-related tax data for use with tax preparation software according to another embodiment.

FIG. 19 illustrates another embodiment of the system. In this embodiment, which shares certain aspects of the embodiment illustrated in FIG. 16 and is numbered consistently employs estimation module 110 as described herein that is stored within the data store 42. In this embodiment, the data capture utility 43 captures data from one or more data sources 48a-48g. In this embodiment, the estimation module 110 is used as described in the FIG. 8A such that one or more of the entries in the data store 42 are populated with estimates 290. FIG. 19 illustrates an example selection of entries in the data store 42 whereby dividend income and interest income are estimated. The estimates 290 may be based on data obtained from one or more of the data sources 48a-48g. For example, prior return data 48g may be analyzed to determine estimated values. Of course, other data sources 48 may also be used. As seen in FIG. 19 estimates that populate the data store 42 may be used to calculate a degree of completeness as is disclosed in FIG. 17. For example, the data capture utility 43 may capture and transfer some data to the data store 42 while other data that populates the data store 42 may be estimated by the estimation module 110. The user may be provided with a message 292 such as "we estimated or completed 50% of your federal tax return. Would you like to continue?" A user may be able to click on the hyperlinked "continue" that would then execute or open the tax preparation software 100.

Figure 20:
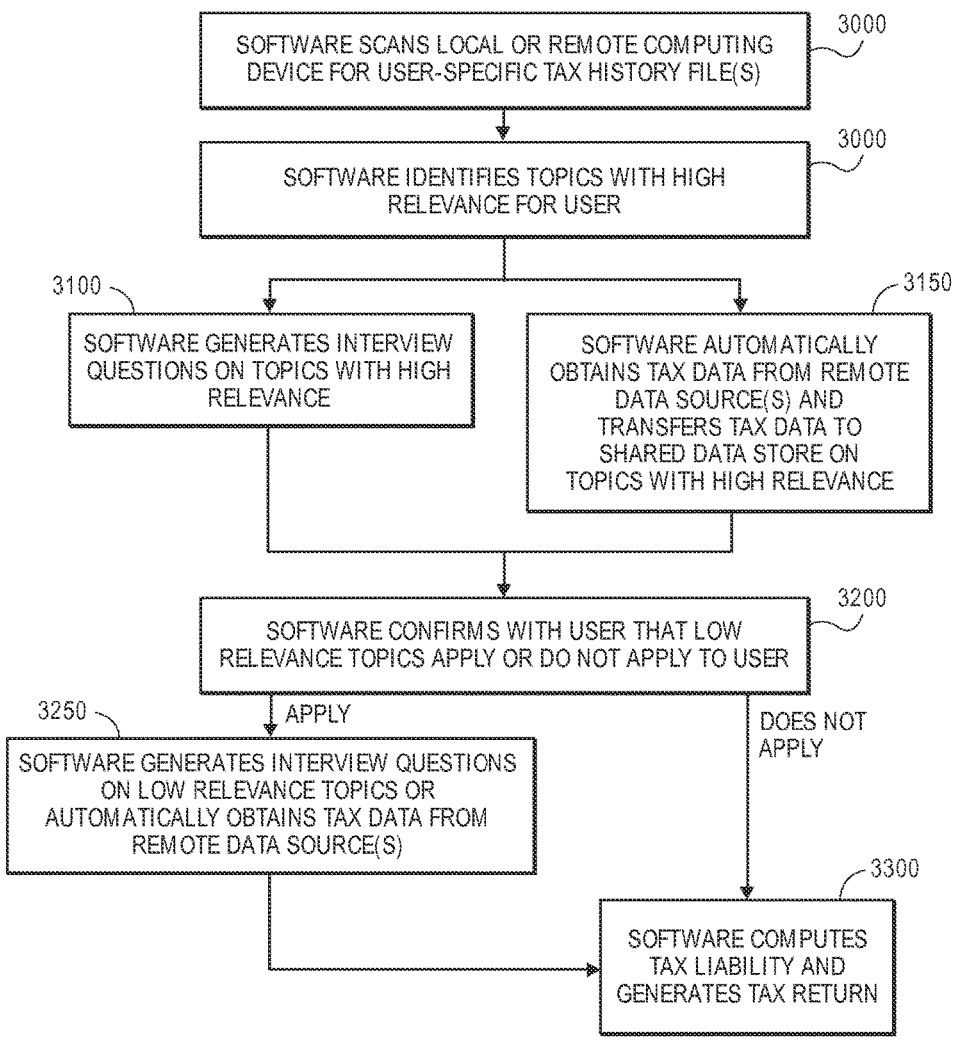
FIG. 20 illustrates a flowchart of operations performed by software running on a computing device to identify tax topics with high relevant to a user based on user-specific tax history files.

FIG. 20 illustrates a flowchart of operations performed by the tax preparation software 100 running on a computing device 102, 103 to identify tax topics with high relevance to a user based on user-specific tax history files. Tax topics with a high relevance to the user are those tax topics in which is more likely than not that the user's current tax return will touch upon that particular tax topic. Of course it should be understood that tax topics may have a range or degrees of relevance to a user. Thus, there may be spectrum of degrees of relevance that vary from low to high. In some embodiments described herein, the cutoff for highly relevant tax topics and less relevant tax topics could be adjusted either upward or downward. For example, a cutoff or threshold of a 75% chance that a particular tax topic applies to a user for a current tax year could be quantified as high relevance in the event the cutoff or threshold is more stringent than what was described previously (e.g., above 50%).

In this particular example, as seen in operation 3000, the software 100 scans either a local resource or a remote resource for user-specific tax history files. For example, the software 100 can scan a local storage device such as a hard drive or flash drive for tax history files. The tax history files may include electronically saved copies of actual tax files or electronic copies of data used for preparation of actual tax returns. For example, the software 100 can scan resources for a .PDF copy or even an image file (.JPEG, etc.) of a prior year tax return. The software 100 can also scan various proprietary file formats (e.g., .tax, .txx (numbers for xx), .ta and the like). There may be multiple years of tax history files that are found or there may be a single year. The software 100 is also able to scan a remote computing device 102, 103 for user-specific tax history files. For example, it is increasingly common for software 100 to be run via a browser or application with tax data of a user being stored remotely, for example, in a cloud environment. In this example, the software 100 is able to scan, for example, for prior tax return data that is stored in a cloud environment. This may be accomplished, for example, by providing the user ID and password for a particular tax filing service that has been used in the past. This may be the same or different tax preparation software 100 that is being used for the current year. For example, the software 100 may be able to access tax data from another provider of tax preparation software. The software 100 can access the saved files and/or data that are contained in such files. In one aspect, the data capture utility 43 that was described herein functions as the utility that scans local or remote files for tax history data.

Next, as seen in operation 3050, the software 100 identifies topics with high relevance for the user. The software 100 may identify topics with high relevance in a number of ways. For example, the software 100 may identify those areas or lines within tax forms where a user has entered text or non-zero numbers. For example, the software 100 may identify that capital gains/losses are a topic of high relevance for this user because in two of the past three years the user has filed a Schedule D and has had a capital gain that he includes on his 1040 tax form and/or line 13 of Form 1040 (for tax year 2014) includes a non-zero entry. Thus, relevancy can also take into account into the frequency in which a particular tax topic appears in prior tax reporting periods. The appearance of Schedule D losses in one out of the past seven years may mean that capital gains/losses may not be particularly relevant to this user because of the infrequency in which they appear on filed tax returns/forms. Conversely, if Schedule D income/losses appear with regularity then there is high probability that Schedule D will be needed in a current year tax return.

As an alternative to looking at data fields contained in actual tax forms or worksheets, the software 100 might also look to data contained within the electronically stored tax files. For example, proprietary tax files may contain a robust amount of information that includes identifying prior interview questions and responses beyond data that ultimately is presented in a filed tax return. The software 100 is able to extract this information to identify topics with high relevance to the user. For example, the tax file data may include question and answer responses about child care. This may indicate that the tax topics of tax credits or deductions pertaining to child care may be a particular priority to this user.

Highly relevant tax topics may also be identified by their impact on a particular tax return. Some tax topics may have large impact on the amount of any refund or tax liability of a taxpayer. For example, for some taxpayers the EITC may change what was otherwise a tax liability into a rather substantial tax refund. The EITC is thus highly relevant to this taxpayer and obtaining the tax data in order to determine whether this credit applies is a priority and interview questions or automatic downloading of data can be geared to quickly and efficiently determine whether the taxpayer is entitled to this credit.

Still referring to FIG. 20, in operation 3100, the software 100 generates interview questions on topics with high relevance to the user that were previously identified. As described herein, in some embodiments, interview questions may be presented to the user only on high or highly relevant topics. Those topics that were not identified as being particularly relevant to the user can, optionally, be grouped together and presented to user later, for example, to verify that none of the topics are related to this year's particular tax filing. In this regard, the user is presented with interview questions that are relevant or germane to the user's own unique tax situation and is not bothered with having to wade through many other tax topics that may not apply. A common problem that many people have with preparing tax returns using software is that it can become a time consuming process to walk through all potential tax topics, many of which may not apply to the user. Some users may not finish preparing a return and may abandon the process out of frustration. This aspect of the invention produces targeted interview questions on topics that apply to a particular user's tax situation. Interview questions can be dynamically generated by the user interface manager 82 as described herein. These are typically displayed on a screen or display and require a response by the user to enter data within a field, respond with a yes/no, or select a dialog response (e.g., check a box).

Alternatively, or in addition to the interview questions described in operation 3100, the software 100 may also automatically obtain tax data from one or more remote data sources 48 using the data capture utility 43 as described herein. This is illustrated in operation 3150 in FIG. 20. The tax data may be obtained and then automatically stored, for example, in the shared data store 42. The tax data is obtained from one or more remote data sources 42 that are associated with tax topics with high relevance. For example, if capital gains/losses are a tax topic that has been identified by the software 100 as a topic with high relevance, then the software 100 may automatically try to download data from the user's brokerage or other financial institution. The data capture utility 43 may be programmed to automatically obtain tax data for data sources 42 linked to particular tax topics. One particular advantage of this method is that resources are not wasted on obtaining data that may be irrelevant to the user. For example, in some cases, obtaining access to a data source 42 may cost money. This money may be paid on behalf of the tax filer by the provider of the tax preparation software 100. Savings can be achieved when payment is made only towards those data sources 42 that are likely to contain data to highly relevant tax topics. There is no need, for example, to waste money on providing access to a commercial database for tax information if that information has no relevancy to the user.

Still referring to FIG. 20, as seen in operation 3200, the software 100 confirms with the user that other topics that were either not automatically obtained or were not covered by interview questions do not apply to the user. These tax topics may be putatively classified as "low relevance" tax topics because the software 100 did not identify them as highly relevant tax topics. Even though these tax topics may be initially deemed to have low relevance the user may still select these topics during the confirmation process. For example, if these "low relevance" tax topics apply to the user then, as seen in operation 3250 the software will then generate interview questions on these topics or automatically obtain this data from one or more data sources 42. Once all of these remaining topics have been addressed (or if they did not apply during the confirmation or verification process 3200), the tax preparation software 100 can then compute tax liability and generate a tax return as seen in operation 3300.

Figure 21:
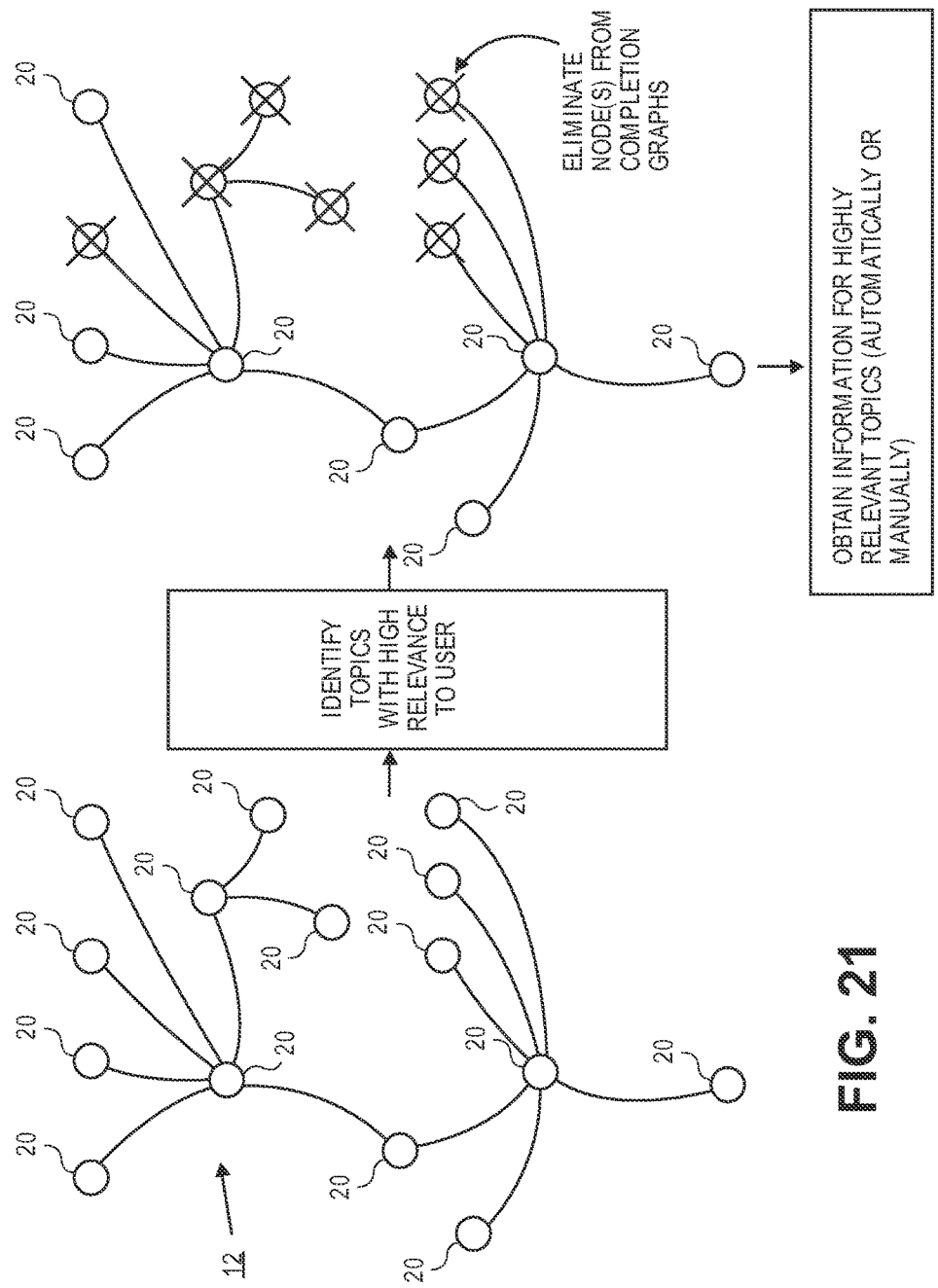
FIG. 21 illustrates how tax completeness graphs are simplified by identifying topics with high or higher relevance and eliminating nodes of low or lower relevance from the completion graphs.

FIG. 21 illustrates an exemplary portion of a tax completion graph 12 with internal nodes 20 with each node representative of a particular tax topic or related to data that is used as part of a tax topic. FIG. 21 illustrates how identifying topics with high relevance to the user can be used to eliminate certain nodes 20 (i.e., indicated as being crossed out). Thus, once it is confirmed that these topics do not apply to the user, the tax completion graph 12 becomes much simpler from a topological perspective. Once the "low relevance" nodes 20 have been removed from the completion graph 12 the information pertaining to the remaining highly relevant topics as represented by the remaining nodes 20 can be automatically or manually obtained as described above. Notice how completion can be arrived at in a much quicker and efficient fashion by addressing relevant tax topics and then ignoring (after confirmation or verification) those topics that do not apply to the taxpayer.

Figure 22:
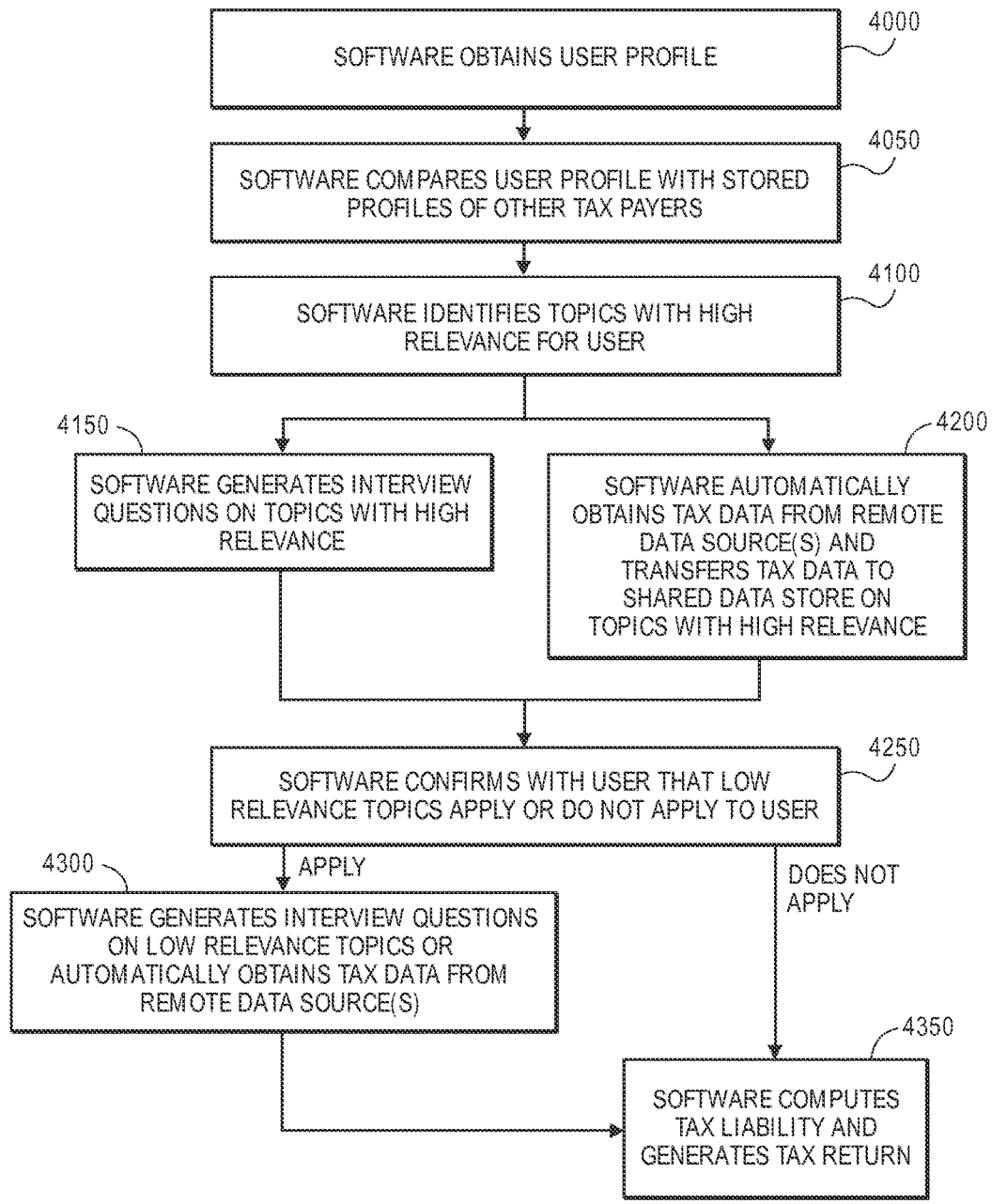
FIG. 22 illustrates a flowchart of operations performed by software running on a computing device to identify tax highly relevant topics using a user profile.

FIG. 22 illustrates a flowchart of operations performed by tax preparation software 100 running on a computing device 102, 103 to identify tax topics with high relevant to a user based on a user profile. As illustrated in operation 4000, the tax preparation software 100 first obtains a user profile of the user (see, e.g., user profile 500 in FIG. 23). The user profile may be obtained by the tax preparation software 100 after a few preliminary questions posed to the user. For example, the user may be asked about his occupation, residence address, tax filing status. Alternatively, the software 100 may automatically assign the user a user profile based on prior year tax data. Based on this information, the tax preparation software 100 establishes a user profile for the user. As seen in operation 4050, the software 100 then compares this generated user profile with the stored profiles of other tax payers. For example, the provider of tax payer software 100 may have large amounts of data on a large number of users. This data can be mined and analyzed to develop user profiles. The stored user profiles can be associated with highly relevant tax topics as described previously. For example, a user profile A can be established that identifies that a user fitting this profile will likely be asking about the Earned Income Tax Credit. In one embodiment, the user profile that has been established based on an interview process or analysis of prior year tax data is then compared with user profiles of other tax payers. This process is seen in operation 4050 of FIG. 22. The user profile is compared with other stored user profiles and identifies, for example, a stored user profile that most closely matches that of the user profile initially generated by the tax preparation software 100. The stored user profile is associated with one or more topics that are likely to be highly relevant to the user. Based on the matching profiles, the software 100 is able to identify those topics with a high degree of relevance to the user as illustrated in operation 4100. In one alternative, there is no need to find a matching profile, instead the user profile 500 that is created and the characteristics associated with the user profile 500 are then queried or analyzed by the software 100 to directly identify relevant topics for a particular user.

Knowing the topics with high relevance to the user, the software 100 can then generate interview questions as illustrated in operation 4150 or automatically obtain this data in operation 4200. These operations are identical to those equivalent operations (3100, 3150) in FIG. 20. The software 100 will then confirm or verify with the user that the ostensible "low relevance" topics apply or do not apply to the tax payer in the current tax reporting year as illustrated in operation 4250. If any low relevance topics do apply then the software 100 will present one or more interview questions on these topics or automatically obtain this information from one or more remote data sources 48 as seen in operation 4300 which operates as explained previously.

Figure 23:
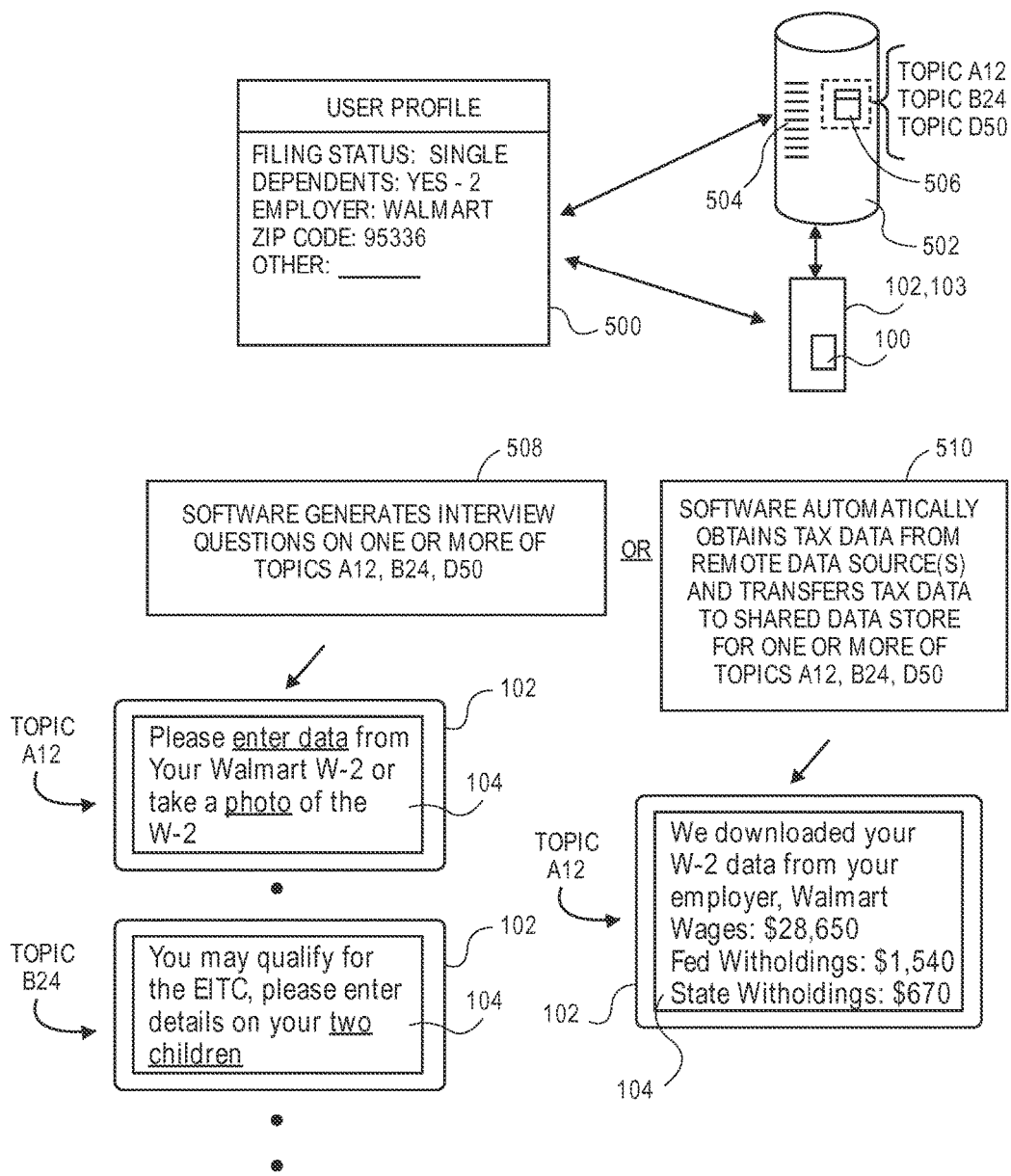
FIG. 23 illustrates a process of utilizing a user profile to generate interview questions on one or more highly relevant topics or automatically obtaining the same from one or more remote data sources.

The user profile may act as a "fingerprint" that identifies a particular type of user. This fingerprint can then be used to identify those topics that are likely highly relevant to the user; either by way of a matching profile or directly analyzing the user profile and outputting tax topics that are relevant to the characteristics contained in the user profile. FIG. 23 illustrates a user profile 500 that has been generated by the tax preparation software 100. In this example, the user profile 500 has several characteristics associated with it (e.g., at least three). Of course, the more characteristics that are associated with a user profile 500 a higher level of confidence can be attributed to the topics that are deemed highly relevant to the user. The user profile 500 includes the filing status (e.g., single), dependent status as well as number of dependents (e.g., two dependents), employer identification (in this example Walmart), and zip code. The user profile 500 may have been generated by the tax preparation software 100 by asking the user a series of preliminary questions or it may have been automatically generated based on data from one or more prior tax returns. Of course, this user profile 500 is only illustrative and more or less characteristics may be included in the profile. Further, particular combinations of characteristics can be used as a fingerprint to identify relevant topics for a user.

Still referring to FIG. 23, the user profile 500 is compared with other profiles 504 stored within the database 502 and a matching or similar profile 506 is identified. This matching profile 506 has associated with it one or more topics that are highly correlated with a user having this particular profile 506. In this example, the topics A12, B24, and D50 are associated with the profile 506. As an alternative to finding a matching profile 506, the characteristics contained within the user profile 500 may analyzed by the software program 100 to identify directly the relevant topics (e.g., topics A12, B24, and D50). Next, as seen in operations 508, 510 the software 100 generates one or more interview questions related to topics A12, B24, and D50. FIG. 23 illustrates a computing device 102 where the user is presented with interview questions regarding topic A12 and topic B24. Another example is illustrated where the tax data related to topic A12 is automatically downloaded onto the computing device 102. Note that the profiles 504 within the database 502 may be constantly updated. For example, while the description has been given that the profiles 504 contained in the database 502 are from prior year returns it is also possible that the database 502 contains tax data from current year tax returns. Thus, the database 502 can be periodically or constantly updated with new profile data so that the identified user profile can be properly associated with the most relevant tax topics.

Figure 24:
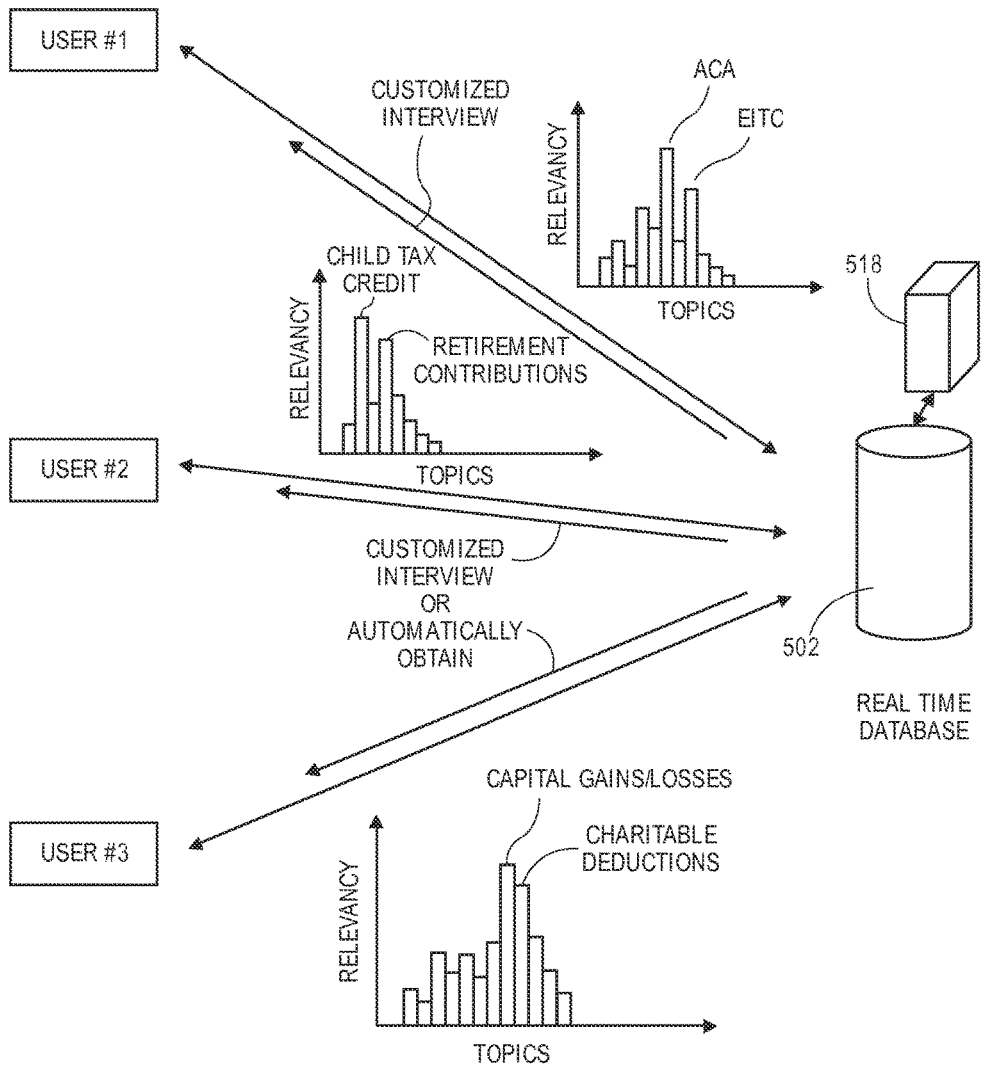
FIG. 24 illustrates how real time statistical data can be used to generate custom tailored interviews for different users with interviews focused on highly relevant tax topics.

FIG. 24 illustrates an embodiment of how the database 502 operating in conjunction with a computer 518 is updated in real time or near real time and can return to the user a customized interview or, alternatively, automatic downloading of relevant tax data. In this embodiment, a statistical fingerprint 520 is illustrated to for user #1. This statistical fingerprint 520 may be associated with a matched profile 506 or the fingerprint 520 is created by analyzing the characteristics of the user profile 500 as described previously. In this example, a histogram is illustrated to show the relevancy of various tax topics. In this particular example, the ACA and EITC are two highly relevant tax topics for user #1. In this particular embodiment, the software 100 would generate interview questions that are tailored to the ACA and EITC. User #1 would thus receive a custom delivered user interface that asks questions of the most relevant topics and demotes or even ignores tax topics that have no particular application to user #1. Likewise, with reference to FIG. 24, user #2 exhibits user profile characteristics that indicate a high degree of relevancy of the child tax credit and retirement contributions. User #2 has a different profile and will have interview questions tailored to include questions regarding any child tax credit or deduction as well as retirement contributions. User #3 has a different profile and for this user has characteristic profile that shows capital gains/losses and deductible contributions as highly relevant to this user. Accordingly, the interview process will be tailored for this user so that questions regarding these topics are presented to the user. Note that the database 502 may be updated in real time such that as more users complete and file taxes additional data is available to analyze to correlate user characteristics with particular tax topics.

Figure 25:
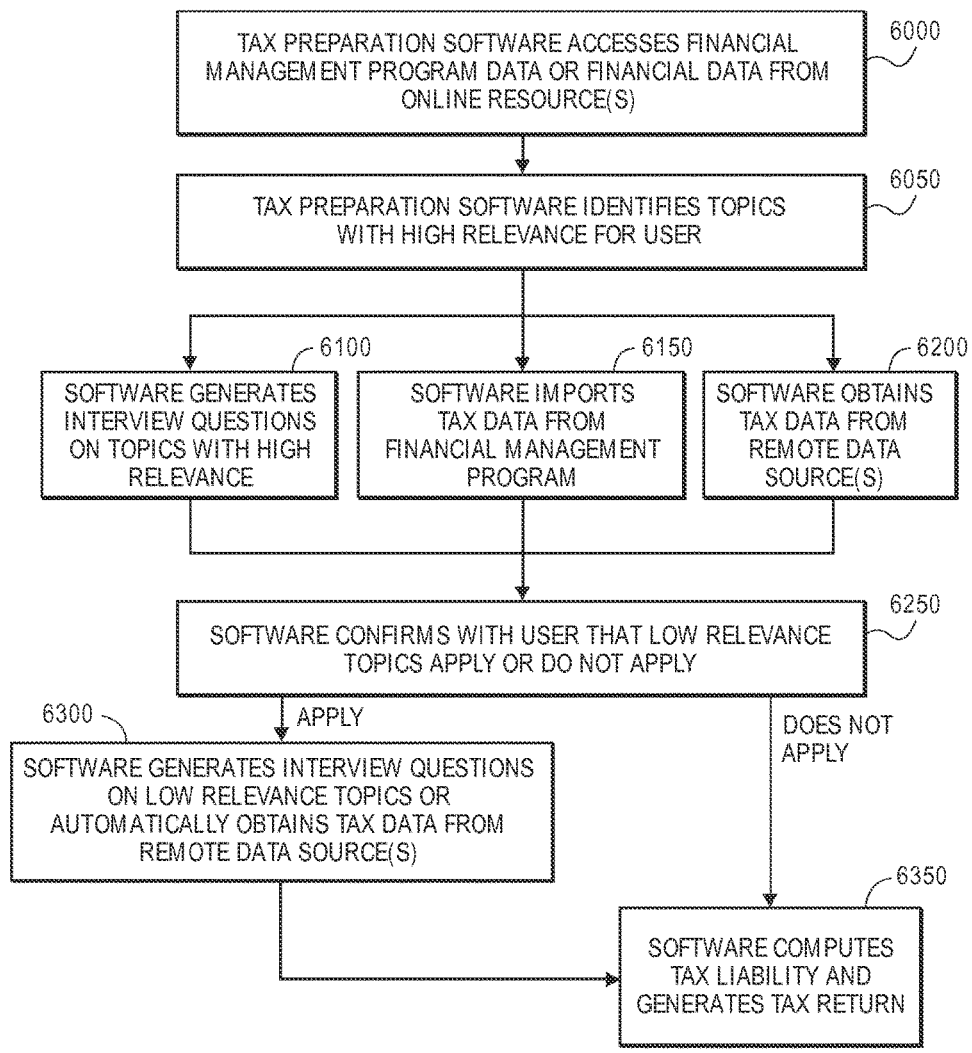
FIG. 25 illustrates a flowchart of operations performed by software running on a computing device to identify highly relevant tax topics by obtaining data from a financial management program or financial data from an online resource.

FIG. 25 illustrates a flowchart of operations performed by tax preparation software 100 running on a computing device 102, 103 to identify tax topics with high relevant to a user based on data obtained from a financial management program/service or financial data from an online resource (e.g., financial institution, brokerage, bank, and the like). In this example, topics of relevance to a taxpayer are automatically generated based on information obtained from, for example, the user's financial management program and more specifically transactions contained or stored as part of the software, program, or application. For example, programs such as QUICKEN, QUICKBOOKS, or MINT track and record very detailed financial data related to owners or account holders. If the user of the software 100 also uses a financial management program, the software 100 may access this data and analyze the transactions as illustrated in operation 6000 of FIG. 25. For example, in one aspect of the invention, the data capture utility 43 may transfer data to a repository such as data store 42 although other storage areas may be used as well. Next, as seen in operation 6050, the tax preparation software 100 identifies the tax topics that have a high degree of relevance to the user based on the transactions. The transactions that are analyzed and form the basis for identifying tax topics may be obtained from the tax year in which the return is being prepared or even prior year data. For example, the software 100 may find a series of monthly, recurring payments to a bank in an amount that is similar to mortgage payment. The software 100 may then make an assumption that the user is a homeowner with a mortgage and thus the mortgage interest deduction will be a relevant tax topic for this user. Of course, this example is only illustrative. The relevancy of particular transactions may be identified by one or more characteristics. The characteristics may include the amount of the transaction(s), the frequency of the transaction(s), the identity of the payee or payer, text that may be included in or associated with the transaction(s), flags paired with the transaction, category associated with the transaction (e.g., mortgage interest).

With reference to FIG. 8B, the topic analysis engine 140 may be used to as part of the software 100 to identify the highly relevant tax topics. The topic analysis engine 140 may identify transactions stored within a data store such as data store 42, although other data stores can be used. Alternatively, the topic analysis engine 140 may work in conjunction with the data capture utility 43 to directly analyze transactions contained within the various remotely located data sources 48. In this sense, the data capture utility 43 may scan the transactions work in conjunction with the topic analysis engine 140 to perform on-the-fly analysis of the transactions to identify relevancy of tax topics.

In one aspect of the invention, the software 100 will then generate 6100 interview questions on the topics with high relevance based on the review of the transactions. These can then be presented to the user to obtain additional information. Alternatively, the software 100 may import tax data directly from the financial management program as illustrated in operation 6150. Alternatively, for highly relevant topics, the software 100 may obtain tax data from one or more remote sources 48 as illustrated in operation 6200 and explained herein previously. For example, in the Example given herein where mortgage payments are made to "Bank A" the software 100 may obtain this data using a data capture utility 43.

As with prior embodiments, after the highly relevant tax topics have been addressed either through interviews, downloads, or transfers from another application, the other non-addressed tax topics are confirmed with the user as either applying or not applying as illustrated in operation 6250. If any of these topics apply, appropriate interview questions will be prepared or the data will be obtained automatically as illustrated in operation 6300. After these topics are complete or none applied, the software 100 can calculate the tax liability and generate the tax return as seen in operation 6350.

Figure 26:
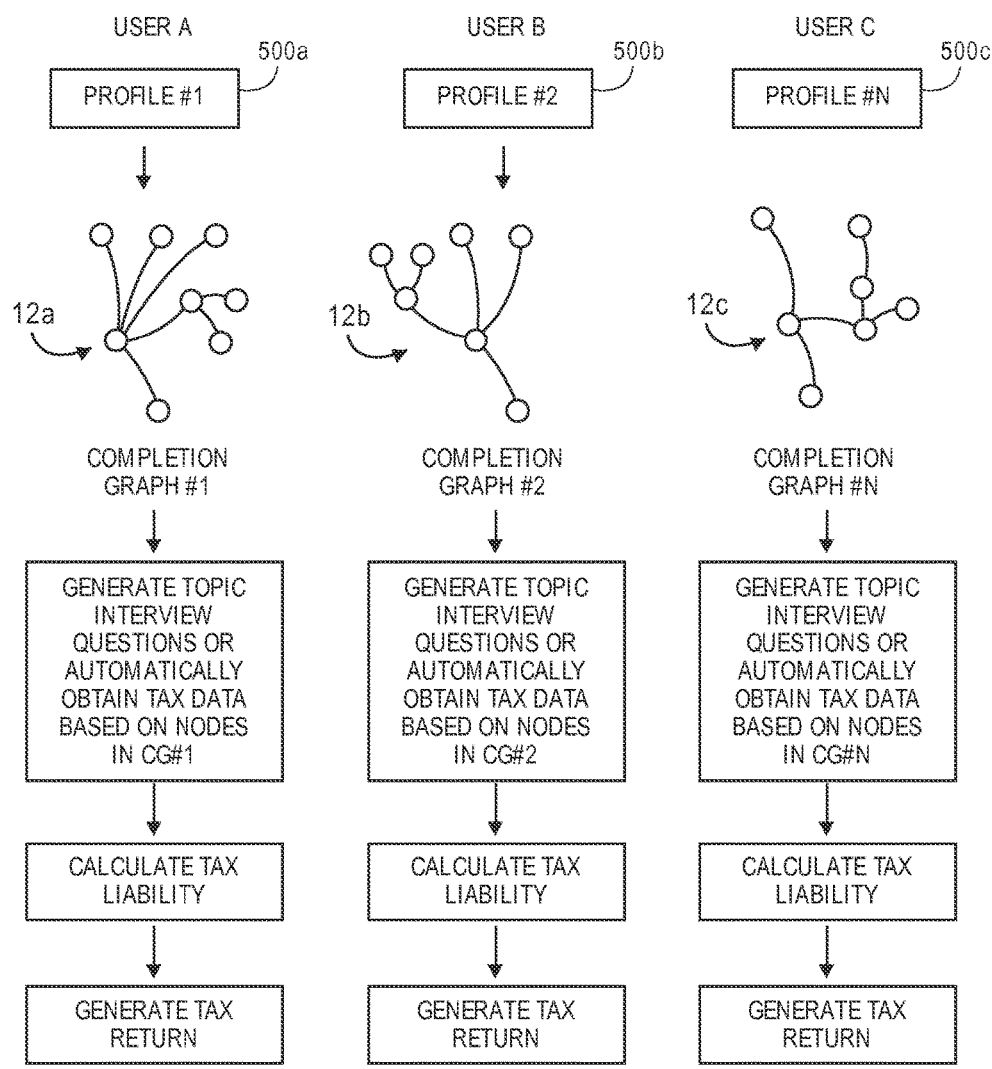
FIG. 26 illustrates three different users having three different profiles. The different user profiles are associated with different tax completion graphs that are used to generate topic interview questions or statements or automatically obtain tax data.

FIG. 26 illustrates how different users (users A, B, C) generate different user profiles 500a, 500b, 500c. The different user profiles can be used to develop or generate different tax completion graphs 12a, 12b, 12c. Each completion graph corresponds the tax topics applicable to the particular user. Note the illustrate completion graphs eliminate those nodes that pertain to irrelevant tax topics. In some instances, nodes may be added back to these graphs if, for example, a user determines during the verification or confirmation process that one or more previously "low relevance" tax topics actually do apply to the user. In such an instance, those nodes can be added back to the tax completion graphs illustrated in FIG. 26. By having tax completion graphs 12a, 12b, 12c already associated with particular user profiles the process of calculating and finalize a tax return becomes much more efficient as the user does not have to make through irrelevant tax topics and interview screens. As seen in FIG. 26, with the completion graphs already identified that correspond to a particular profile, the software 100 will generate interview questions or automatically obtain this tax data for the nodes within the corresponding completion graph (corresponding to highly relevant topics) as explained in the prior embodiments. Note how different profiles have different completion graphs 12a, 12b, 12c. The software 100 will then calculate the tax liability and generate a tax return.

Figure 27:
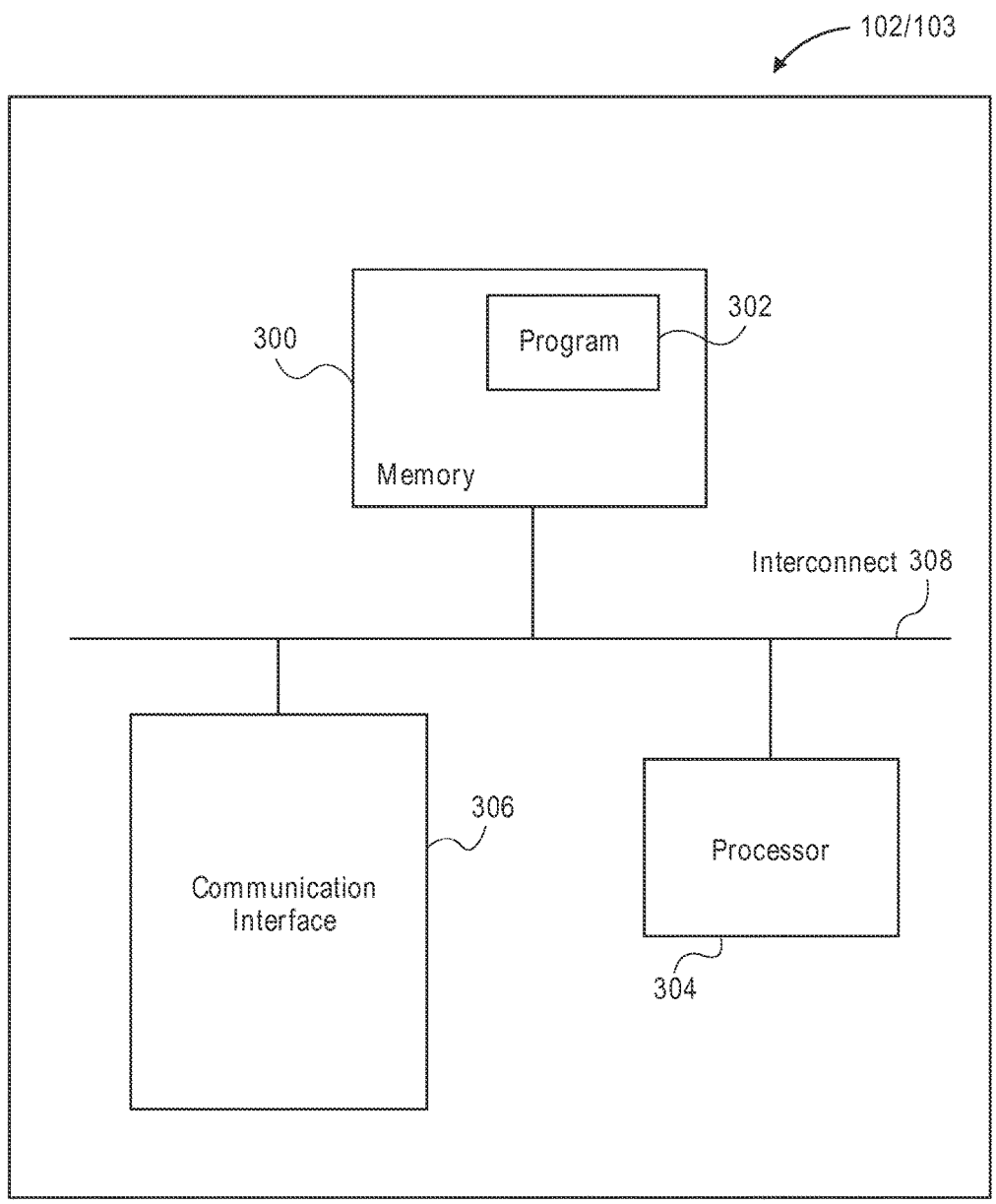
FIG. 27 illustrates generally the components of a computing device that may be utilized to execute the software for automatically calculating or determining tax liability or refund amount and preparing a tax return based thereon according to one embodiment.

FIG. 27 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 27 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method for the targeted gathering of tax data for use with tax preparation software comprising:

a computing device presenting to a user a plurality of interview questions or statements;

the computing device creating a user profile based on the responses to the interview questions or statements;

the computing device executing a data capture utility, the data capture utility including an application programming interface (API) which accesses one or more remotely located data sources and captures tax data from the data sources;

the computing device identifying highly relevant tax topics based on the user profile, wherein a highly relevant tax topic is a tax topic determined to have a probability of being relevant to the user greater than a predetermined threshold;

the computing device confirming with the user whether other tax topics apply to the user, wherein tax topics which are not identified as a highly relevant tax topic and not confirmed by the user as a tax topic which applies to the user are referred to as a low relevance tax topic;

the computing device modifying one or more completion graphs for completing all required data fields for computing a tax return based on the identified highly relevant tax topics by eliminating nodes on the completion graphs representing the low relevance tax topics, the completion graphs converted into a plurality of decision tables, each decision table representing a plurality of columns wherein each column corresponds to a tax question and a plurality of rows wherein each row corresponds to a completion path for a tax rule, thereby forming a plurality of cells with each cell corresponding to a particular row and column, each cell in a respective row having a logic operator corresponding to the tax question of each cell's respective column such that completion of each respective row is determined by the logic operators in the respective row, wherein each cell is related to a node on the tax calculation graph;

the computing device executing a tax logic agent of the tax preparation software, the tax logic agent traversing the decision tables using user-specific tax data to determine one or more suggested tax questions for obtaining missing tax data required to complete the tax return;

the computing device executing a user interface manager of the tax preparation software, the user interface manager receiving the suggested tax questions, determining a tax question to be presented to a user for completing a tax return and generating an interview screen having the tax question to be presented to a user based at least in part upon the suggested tax questions, the user interface manager being detached from the tax logic agent such that the interview screen is not rigidly defined by the tax logic agent; and the computing device executing a tax calculation engine of the tax preparation software configured to compute a tax liability or refund amount.

2. The computer-implemented method of claim 1, wherein the computing device matches the user profile with other stored user profiles and the highly relevant tax topics are based on the matched user profile.

3. The computer-implemented method of claim 1, wherein one or more characteristics of the user profile are compared with user profiles stored in a database that correlate tax topics with the characteristics for the stored user profiles.

4. The computer-implemented method of claim 1, wherein the user profile has at least three characteristics.

5. The computer-implemented method of claim 1, further comprising the computing device executing the user interface manager to generate additional interview questions or statements on the other tax topics.

6. The computer-implemented method of claim 1, further comprising the computing device executing a data capture utility connecting to the one or more remotely located data sources, the data capture utility capturing and transferring at least some tax data pertaining to the user to a data store associated with the tax preparation software.

7. The computer-implemented method of claim 1, further comprising the computer generating a tax return.

8. The computer-implemented method of claim 7, further comprising the computer electronically transmitting the tax return to a tax authority.

9. The method of claim 1, wherein the API includes one or more of: a screen scraping utility, a web crawler, and a program that is able to log into a website or other online interface.

10. The method of claim 1, wherein the API parses, filters and organizes the tax data captured from the remotely located data sources.

11. The method of claim 1, wherein the data capture utility operates in one or more of a plurality of different modes, the modes including a first mode in which the user provides authentication information for an account and the data capture utility accesses tax data from the account using the authentication information, and a second mode in which the user provides access to a financial management program having tax data regarding the user and the data capture utility access tax data from the financial management program.

12. A computer-implemented method for the targeted gathering of tax data for use with tax preparation software comprising:

a computing device presenting to a user a plurality of interview questions or statements;

the computing device creating a user profile based on the responses to the interview questions or statements;

the computing device executing a data capture utility, the data capture utility including an application programming interface (API) configured to access one or more remotely located data sources and capture tax data from the data sources;

the computing device identifying highly relevant tax topics based on the user profile wherein a highly relevant tax topic is a tax topic determined to have a probability of being relevant to the user greater than a predetermined threshold;

the computing device executing a data capture utility connecting to the one or more remotely located data sources containing the highly relevant tax topics, the data capture utility capturing and transferring at least some tax data pertaining to the user to a data store associated with the tax preparation software;

the computing device confirming with the user whether other tax topics apply to the user wherein tax topics which are not identified as a highly relevant tax topic and not confirmed by the user as a tax topic which applies to the user are referred to as a low relevance tax topic;

the computing device modifying one or more completion graphs for completing all required data fields for computing a tax return based on the identified highly relevant tax topics by eliminating nodes on the completion graphs representing the low relevance tax topics, the completion graphs converted into a plurality of decision tables, each decision table representing a plurality of columns wherein each column corresponds to a tax question and a plurality of rows wherein each row corresponds to a completion path for a tax rule, thereby forming a plurality of cells with each cell corresponding to a particular row and column, each cell in a respective row having a logic operator corresponding to the tax question of each cell's respective column such that completion of each respective row is determined by the logic operators in the respective row, wherein each cell is related to a node on the tax calculation graph;

the computing device executing a tax logic agent of the tax preparation software, the tax logic agent traversing the decision tables using user-specific tax data to determine one or more suggested tax questions for obtaining missing tax data required to complete the tax return;

the computing device executing a user interface manager of the tax preparation software, the user interface manager receiving the suggested tax questions, determining a tax question to be presented to a user for completing a tax return and generating an interview screen having the tax question to be presented to a user based at least in part upon the suggested tax questions, the user interface manager being detached from the tax logic agent such that the interview screen is not rigidly defined by the tax logic agent; and the computing device executing a tax calculation engine of the tax preparation software configured to compute a tax liability or refund amount.

13. The computer-implemented method of claim 12, wherein the computing device matches the user profile with other stored user profiles and the highly relevant tax topics are based on the matched user profile.

14. The computer-implemented method of claim 12, wherein one or more characteristics of the user profile are compared with user profiles stored in a database that correlate tax topics with the characteristics for the stored user profiles.

15. The computer-implemented method of claim 12, wherein the user profile has at least three characteristics.

16. The computer-implemented method of claim 12, further comprising the computing device executing the user interface manager to generate additional interview questions or statements on the other tax topics.

17. The computer-implemented method of claim 12, further comprising the computer generating a tax return.

18. The computer-implemented method of claim 17, further comprising the computer electronically transmitting the tax return to a tax authority.

19. A computer-implemented method for the targeted gathering of tax data for use with tax preparation software comprising:

a computing device extracting user-specific tax data from prior year tax data stored in a local or remotely accessible storage resource;

the computing device executing a data capture utility, the data capture utility including an application programming interface (API) configured to access one or more remotely located data sources and capture tax data from the data sources;

the computing device creating a user profile based on one or more characteristics of the prior year tax data;

the computing device identifying highly relevant tax topics based on the user profile wherein a highly relevant tax topic is a tax topic determined to have a probability of being relevant to the user greater than a predetermined threshold;

the computing device generating questions or statements requiring a user response, or automatically downloading data from one or more remote data sources on said highly relevant tax topics;

the computing device confirming with a user whether other tax topics apply to the user, wherein tax topics which are not identified as a highly relevant tax topic and not confirmed by the user as a tax topic which applies to the user are referred to as a low relevance tax topic;

the computing device modifying one or more completion graphs for completing all required data fields for computing a tax return based on the identification of the highly relevant tax topics by eliminating nodes on the completion graphs representing the low relevance tax topics, the completion graphs converted into a plurality of decision tables, each decision table representing a plurality of columns wherein each column corresponds to a tax question and a plurality of rows wherein each row corresponds to a completion path for a tax rule, thereby forming a plurality of cells with each cell corresponding to a particular row and column, each cell in a respective row having a logic operator corresponding to the tax question of each cell's respective column such that completion of each respective row is determined by the logic operators in the respective row, wherein each cell is related to a node on the tax calculation graph;

the computing device executing a tax logic agent of the tax preparation software, the tax logic agent traversing the decision tables using user-specific tax data to determine one or more suggested tax questions for obtaining missing tax data required to complete the tax return;

the computing device executing a user interface manager of the tax preparation software, the user interface manager receiving the suggested tax questions, determining a tax question to be presented to a user for completing a tax return and generating an interview screen having the tax question to be presented to a user based at least in part upon the suggested tax questions, the user interface manager being detached from the tax logic agent such that the interview screen is not rigidly defined by the tax logic agent; and the computing device executing a tax calculation engine of the tax preparation software configured to compute a tax liability or refund amount.

20. The computer-implemented method of claim 19, wherein the computing device matches the user profile with other stored user profiles and the highly relevant tax topics are based on the matched user profile.

21. The computer-implemented method of claim 19, wherein one or more characteristics of the user profile are compared with user profiles stored in a database that correlate tax topics with the characteristics for the stored user profiles.

22. The computer-implemented method of claim 19, further comprising the computer generating a tax return.

23. The computer-implemented method of claim 22, further comprising the computer electronically transmitting the tax return to a tax authority.

* * * * *